United States Patent
Bowles

(10) Patent No.: US 12,182,773 B2
(45) Date of Patent: Dec. 31, 2024

(54) SECONDARY MARKET AND VENDING SYSTEM FOR DEVICES

(71) Applicant: ecoATM, LLC, San Diego, CA (US)

(72) Inventor: Mark Vincent Bowles, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 0 days.

(21) Appl. No.: 18/462,213

(22) Filed: Sep. 6, 2023

(65) Prior Publication Data

US 2024/0249251 A1 Jul. 25, 2024

Related U.S. Application Data

(63) Continuation of application No. 17/394,255, filed on Aug. 4, 2021, now Pat. No. 11,790,328, which is a continuation of application No. 15/901,526, filed on Feb. 21, 2018, now Pat. No. 11,107,046, which is a continuation of application No. 13/862,395, filed on Apr. 13, 2013, now Pat. No. 9,904,911, which is a continuation of application No. 13/562,292, filed on Jul. 30, 2012, now Pat. No. 8,423,404, which is a continuation of application No. 13/017,560, filed on
(Continued)

(51) Int. Cl.
*G06Q 10/30* (2023.01)
*G06Q 30/02* (2023.01)
*G06Q 30/0207* (2023.01)
*G07F 7/06* (2006.01)
*H04M 1/02* (2006.01)

(52) U.S. Cl.
CPC ......... *G06Q 10/30* (2013.01); *G06Q 30/0237* (2013.01); *G06Q 30/0278* (2013.01); *G07F 7/06* (2013.01); *H04M 1/0287* (2013.01); *Y02W 30/82* (2015.05); *Y02W 90/00* (2015.05)

(58) Field of Classification Search
None
See application file for complete search history.

(56) References Cited

U.S. PATENT DOCUMENTS 1,327,315 A 1/1920 Davies
3,808,439 A 4/1974 Renius
(Continued)

FOREIGN PATENT DOCUMENTS

CA 2760863 11/2010
CA 2926097 11/2020
(Continued)

OTHER PUBLICATIONS

2006 Florida Statutes Title XXXIII, Chapter 538, Sections 538.03 and 538.04, 7 pages.
(Continued)

*Primary Examiner* — Jan P Mincarelli
(74) *Attorney, Agent, or Firm* — Perkins Coie LLP

(57) ABSTRACT

A recycling kiosk for recycling and financial remuneration for submission of a mobile telephone is disclosed herein. The recycling kiosk includes an inspection area with at least one camera and a plurality of electrical connectors in order to perform a visual analysis and an electrical analysis of the mobile telephone for determination of a value of the mobile telephone. The recycling kiosk also includes a processor, a display and a user interface.

20 Claims, 16 Drawing Sheets

Related U.S. Application Data

Jan. 31, 2011, now Pat. No. 8,239,262, which is a continuation of application No. 12/727,624, filed on Mar. 19, 2010, now Pat. No. 7,881,965, which is a continuation-in-part of application No. 12/573,089, filed on Oct. 2, 2009, now Pat. No. 8,195,511.

(60) Provisional application No. 61/183,510, filed on Jun. 2, 2009, provisional application No. 61/102,304, filed on Oct. 2, 2008.

(56) References Cited

U.S. PATENT DOCUMENTS

| | | |
|---|---|---|
| 4,248,334 A | 2/1981 | Hanley et al. |
| 4,272,757 A | 6/1981 | McLaughlin et al. |
| 4,519,522 A | 5/1985 | McElwee |
| 4,593,820 A | 6/1986 | Antonie |
| 4,715,709 A | 12/1987 | Sekine et al. |
| 4,821,118 A | 4/1989 | Lafreniere |
| 4,845,636 A | 7/1989 | Walker |
| 4,870,357 A | 9/1989 | Young et al. |
| 4,878,736 A | 11/1989 | Hekker et al. |
| 4,893,789 A | 1/1990 | Novorsky |
| 4,927,051 A | 5/1990 | Falk et al. |
| 4,951,308 A | 8/1990 | Bishop et al. |
| 5,025,344 A | 6/1991 | Maly et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,159,560 A | 10/1992 | Newell et al. |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,413,454 A | 5/1995 | Movesian |
| 5,419,438 A | 5/1995 | Squyres et al. |
| 5,436,554 A | 7/1995 | Decker |
| 5,482,140 A | 1/1996 | Moore |
| 5,570,920 A | 11/1996 | Crisman et al. |
| 5,572,444 A | 11/1996 | Lentz et al. |
| 5,610,710 A | 3/1997 | Canfield et al. |
| 5,717,780 A | 2/1998 | Mitsumune et al. |
| 5,747,784 A | 5/1998 | Walter et al. |
| 5,748,084 A | 5/1998 | Isikoff |
| 5,775,806 A | 7/1998 | Allred |
| 5,839,058 A | 11/1998 | Phillips et al. |
| 5,871,371 A | 2/1999 | Rothenberger et al. |
| 5,920,338 A | 7/1999 | Katz |
| 5,937,396 A | 8/1999 | Konya |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,055,512 A | 4/2000 | Dean et al. |
| 6,100,986 A | 8/2000 | Rydningen |
| 6,170,702 B1 | 1/2001 | Zettler et al. |
| 6,181,805 B1 | 1/2001 | Koike et al. |
| 6,228,008 B1 | 5/2001 | Pollington et al. |
| 6,234,812 B1 | 5/2001 | Ivers et al. |
| 6,259,827 B1 | 7/2001 | Nichani |
| 6,264,104 B1 | 7/2001 | Jenkins et al. |
| 6,323,782 B1 | 11/2001 | Stephens et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,412,654 B1 | 7/2002 | Cleeve |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,575,363 B1 | 6/2003 | Leason et al. |
| 6,587,581 B1 | 7/2003 | Matsuyama et al. |
| 6,595,684 B1 | 7/2003 | Casagrande et al. |
| 6,597,552 B1 | 7/2003 | Griepentrog et al. |
| 6,633,377 B1 | 10/2003 | Weiss et al. |
| 6,667,800 B1 | 12/2003 | Larsson et al. |
| 6,687,679 B1 | 2/2004 | Van Luchene |
| 6,748,296 B2 | 6/2004 | Banerjee et al. |
| 6,754,637 B1 | 6/2004 | Stenz |
| 6,758,370 B2 | 7/2004 | Cooke et al. |
| 6,758,394 B2 | 7/2004 | Maskatiya et al. |
| 6,795,201 B2 | 9/2004 | Rangarajan et al. |
| 6,798,528 B1 | 9/2004 | Hartman |
| 6,822,422 B2 | 11/2004 | Sagawa |
| 6,842,596 B2 | 1/2005 | Morii et al. |
| 6,847,393 B2 | 1/2005 | Ashe |
| 6,854,656 B2 | 2/2005 | Matsumori |
| 6,874,932 B2 | 4/2005 | Devitt et al. |
| 6,882,269 B2 | 4/2005 | Moreno |
| 6,886,744 B2 | 5/2005 | Ichihara et al. |
| 6,947,941 B1 | 9/2005 | Koon |
| D512,964 S | 12/2005 | Kissinger et al. |
| 6,983,067 B2 | 1/2006 | Cox |
| 7,001,038 B2 | 2/2006 | Bock et al. |
| 7,027,031 B2 | 4/2006 | Kawasaki et al. |
| 7,039,609 B2 | 5/2006 | Aoki |
| 7,062,454 B1 | 6/2006 | Giannini et al. |
| 7,069,236 B1 | 6/2006 | Tsunenari |
| 7,076,449 B2 | 7/2006 | Tsunenari et al. |
| 7,086,592 B2 | 8/2006 | Wagner et al. |
| 7,109,293 B2 | 9/2006 | Hwang et al. |
| 7,142,335 B2 | 11/2006 | Tesavis |
| 7,153,086 B2 | 12/2006 | Kauppila et al. |
| 7,158,170 B2 | 1/2007 | Gustavsson |
| 7,164,518 B2 | 1/2007 | Yang |
| 7,166,856 B2 | 1/2007 | Cho et al. |
| 7,178,720 B1 | 2/2007 | Strubbe et al. |
| 7,200,497 B2 | 4/2007 | Wang et al. |
| 7,205,529 B2 | 4/2007 | Andersen et al. |
| 7,213,754 B2 | 5/2007 | Eglen et al. |
| 7,213,766 B2 | 5/2007 | Ryan et al. |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Brewington |
| 7,343,319 B1 | 3/2008 | Jen |
| 7,348,884 B2 | 3/2008 | Higham |
| 7,388,977 B2 | 6/2008 | Wang et al. |
| 7,398,921 B2 | 7/2008 | Zito, Jr. |
| 7,407,392 B1 | 8/2008 | Cooke et al. |
| 7,408,674 B2 | 8/2008 | Moro et al. |
| 7,431,158 B2 | 10/2008 | Yamada et al. |
| 7,455,226 B1 | 11/2008 | Hammond et al. |
| 7,520,666 B2 | 4/2009 | Pevzner et al. |
| 7,529,687 B1 | 5/2009 | Phan |
| 7,567,344 B2 | 7/2009 | LeBlanc et al. |
| 7,577,496 B2 | 8/2009 | Walker et al. |
| 7,584,269 B2 | 9/2009 | Moore et al. |
| 7,588,165 B2 | 9/2009 | Prichard et al. |
| 7,642,687 B2 | 1/2010 | Kageyama et al. |
| 7,646,193 B2 | 1/2010 | Suzuki et al. |
| 7,649,450 B2 | 1/2010 | Campion et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,848,833 B2 | 12/2010 | Li |
| 7,881,965 B2 | 2/2011 | Bowles et al. |
| 7,890,373 B2 | 2/2011 | Junger |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,156,008 B2 | 4/2012 | Bae et al. |
| 8,195,511 B2 | 6/2012 | Bowles et al. |
| 8,200,533 B2 | 6/2012 | Librizzi et al. |
| 8,200,736 B2 | 6/2012 | Shi |
| 8,215,546 B2 | 7/2012 | Lin et al. |

(56) References Cited

U.S. PATENT DOCUMENTS

| | | |
|---|---|---|
| 8,234,185 B2 | 7/2012 | Davis |
| 8,239,262 B2 | 8/2012 | Bowles et al. |
| 8,254,883 B2 | 8/2012 | Uchida |
| 8,266,008 B1 | 9/2012 | Siegel et al. |
| 8,340,815 B2 | 12/2012 | Peters et al. |
| 8,369,987 B2 | 2/2013 | Claessen |
| 8,417,234 B2 | 4/2013 | Sanding et al. |
| 8,423,404 B2 | 4/2013 | Bowles et al. |
| 8,429,021 B2 | 4/2013 | Kraft et al. |
| 8,463,646 B2 | 6/2013 | Bowles |
| 8,543,358 B2 | 9/2013 | Trabona |
| 8,606,633 B2 | 12/2013 | Tarbert et al. |
| 8,718,717 B2 | 5/2014 | Vaknin et al. |
| 9,641,997 B2 | 5/2017 | Vratskides |
| 9,818,160 B2 | 11/2017 | Bowles et al. |
| 9,881,284 B2 | 1/2018 | Bowles et al. |
| 9,885,672 B2 | 2/2018 | Forutanpour et al. |
| 9,904,911 B2 | 2/2018 | Bowles et al. |
| 9,911,102 B2 | 3/2018 | Bowles |
| 10,032,140 B2 | 7/2018 | Bowles et al. |
| 10,043,339 B2 | 8/2018 | Walker et al. |
| 10,055,798 B2 | 8/2018 | Bowles et al. |
| 10,127,647 B2 | 11/2018 | Forutanpour et al. |
| 10,157,427 B2 | 12/2018 | Bowles et al. |
| 10,269,110 B2 | 4/2019 | Forutanpour et al. |
| 10,401,411 B2 | 9/2019 | Snook et al. |
| 10,417,615 B2 | 9/2019 | Bowles et al. |
| 10,438,174 B2 | 10/2019 | Bowles et al. |
| 10,445,708 B2 | 10/2019 | Hunt et al. |
| 10,475,002 B2 | 11/2019 | Silva et al. |
| 10,496,963 B2 | 12/2019 | Silva et al. |
| 10,572,946 B2 | 2/2020 | Bowles et al. |
| 10,825,082 B2 | 11/2020 | Librizzi et al. |
| 10,853,873 B2 | 12/2020 | Bowles et al. |
| 10,860,990 B2 | 12/2020 | Bowles et al. |
| 10,909,673 B2 | 2/2021 | Forutanpour et al. |
| 11,010,841 B2 | 5/2021 | Bowles et al. |
| 11,080,662 B2 | 8/2021 | Bowles et al. |
| 11,080,672 B2 | 8/2021 | Bowles |
| 11,107,046 B2 | 8/2021 | Bowles |
| 11,122,034 B2 | 9/2021 | Cicchitto |
| 11,126,973 B2 | 9/2021 | Silva et al. |
| 11,232,412 B2 | 1/2022 | Hunt et al. |
| 11,315,093 B2 | 4/2022 | Bowles |
| 11,436,570 B2 | 9/2022 | Bowles et al. |
| 11,443,289 B2 | 9/2022 | Bowles et al. |
| 11,462,868 B2 | 10/2022 | Forutanpour et al. |
| 11,482,067 B2 | 10/2022 | Forutanpour et al. |
| 11,526,932 B2 | 12/2022 | Bowles et al. |
| 11,734,654 B2 | 8/2023 | Silva et al. |
| 11,790,327 B2 | 10/2023 | Bowles et al. |
| 11,790,328 B2 | 10/2023 | Forutanpour et al. |
| 11,798,250 B2 | 10/2023 | Forutanpour et al. |
| 11,803,954 B2 | 10/2023 | Forutanpour et al. |
| 11,843,206 B2 | 12/2023 | Forutanpour et al. |
| D1,010,271 S | 1/2024 | Forutanpour et al. |
| 11,907,915 B2 | 2/2024 | Bowles et al. |
| 11,922,467 B2 | 3/2024 | Forutanpour et al. |
| 11,935,138 B2 | 3/2024 | Bowles et al. |
| 11,989,701 B2 | 5/2024 | Hunt et al. |
| 11,989,710 B2 | 5/2024 | Forutanpour et al. |
| 12,008,520 B2 | 6/2024 | Bowles |
| 12,033,454 B2 | 7/2024 | Forutanpour et al. |
| 2001/0025883 A1 | 10/2001 | Ichihara et al. |
| 2001/0035425 A1 | 11/2001 | Rocco et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0067184 A1 | 6/2002 | Smith et al. |
| 2002/0087413 A1 | 7/2002 | Mahaffy et al. |
| 2002/0112177 A1 | 8/2002 | Voltmer |
| 2002/0129170 A1 | 9/2002 | Moore et al. |
| 2002/0147656 A1 | 10/2002 | Tam |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0018897 A1 | 1/2003 | Bellis, Jr. et al. |
| 2003/0025476 A1 | 2/2003 | Trela |
| 2003/0036866 A1 | 2/2003 | Nair et al. |
| 2003/0061150 A1 | 3/2003 | Kocher et al. |
| 2003/0100707 A1 | 5/2003 | Hwang et al. |
| 2003/0146898 A1 | 8/2003 | Kawasaki et al. |
| 2003/0158789 A1 | 8/2003 | Miura et al. |
| 2003/0170529 A1 | 9/2003 | Sagawa |
| 2003/0179371 A1 | 9/2003 | Rangarajan et al. |
| 2003/0191675 A1 | 10/2003 | Murashita |
| 2003/0197782 A1 | 10/2003 | Ashe |
| 2003/0204289 A1 | 10/2003 | Banerjee et al. |
| 2004/0012825 A1 | 1/2004 | Tesavis |
| 2004/0039639 A1 | 2/2004 | Walker |
| 2004/0088231 A1 | 5/2004 | Davis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0184651 A1* | 9/2004 | Nordbryhn ........... B07C 5/3422 382/142 |
| 2004/0186744 A1 | 9/2004 | Lux |
| 2004/0189812 A1 | 9/2004 | Gustavsson |
| 2004/0200902 A1 | 10/2004 | Ishioroshi |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0243478 A1 | 12/2004 | Walker et al. |
| 2004/0262521 A1 | 12/2004 | Devitt et al. |
| 2005/0027622 A1 | 2/2005 | Walker et al. |
| 2005/0043897 A1 | 2/2005 | Meyer |
| 2005/0109841 A1 | 5/2005 | Ryan et al. |
| 2005/0128551 A1 | 6/2005 | Yang |
| 2005/0135917 A1 | 6/2005 | Kauppila et al. |
| 2005/0137942 A1 | 6/2005 | LaFluer |
| 2005/0139661 A1 | 6/2005 | Eglen et al. |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0167580 A1 | 1/2006 | Whittier |
| 2006/0022827 A1 | 2/2006 | Highham |
| 2006/0038114 A9 | 2/2006 | Cofer et al. |
| 2006/0047573 A1 | 3/2006 | Mitchell et al. |
| 2006/0074756 A1 | 4/2006 | Boykin |
| 2006/0085158 A1 | 4/2006 | Cakiner |
| 2006/0184379 A1 | 8/2006 | Tan et al. |
| 2006/0195384 A1 | 8/2006 | Bauer et al. |
| 2006/0219776 A1 | 10/2006 | Finn |
| 2006/0229108 A1 | 10/2006 | Cehelnik |
| 2006/0235747 A1 | 10/2006 | Hammond et al. |
| 2006/0217152 A1 | 11/2006 | Fok et al. |
| 2006/0258008 A1 | 11/2006 | Holler et al. |
| 2006/0261931 A1 | 11/2006 | Cheng et al. |
| 2006/0271431 A1 | 11/2006 | Wehr et al. |
| 2006/0279307 A1 | 12/2006 | Wang et al. |
| 2006/0280356 A1 | 12/2006 | Yamagashi |
| 2006/0287929 A1 | 12/2006 | Bae et al. |
| 2007/0012665 A1 | 1/2007 | Nelson |
| 2007/0013124 A1 | 1/2007 | Graef et al. |
| 2007/0013139 A1 | 1/2007 | Kumagai |
| 2007/0032098 A1 | 2/2007 | Bowles et al. |
| 2007/0050083 A1 | 3/2007 | Signorelli |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0150403 A1 | 6/2007 | Mock et al. |
| 2007/0140310 A1 | 7/2007 | Rolton et al. |
| 2007/0205751 A1 | 9/2007 | Suzuki et al. |
| 2007/0258085 A1 | 11/2007 | Robbins |
| 2007/0263099 A1 | 11/2007 | Motta et al. |
| 2007/0269099 A1 | 11/2007 | Nishino et al. |
| 2007/0276911 A1 | 11/2007 | Bhumkar |
| 2007/0281734 A1 | 12/2007 | Mizrachi |

(56) References Cited

U.S. PATENT DOCUMENTS

| | | |
|---|---|---|
| 2007/0282999 A1 | 12/2007 | Tu et al. |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0071627 A1 | 3/2008 | Junger |
| 2008/0097770 A1 | 4/2008 | Low et al. |
| 2008/0109746 A1 | 5/2008 | Mayer |
| 2008/0111989 A1 | 5/2008 | Dufour et al. |
| 2008/0133432 A1 | 6/2008 | Ramseyer |
| 2008/0149720 A1 | 6/2008 | Colville |
| 2008/0167578 A1 | 7/2008 | Bryer et al. |
| 2008/0177598 A1 | 7/2008 | Davie |
| 2008/0201232 A1 | 8/2008 | Walker |
| 2008/0207198 A1 | 8/2008 | Juric |
| 2008/0228582 A1 | 9/2008 | Fordyce |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0260235 A1 | 10/2008 | Cai et al. |
| 2008/0277467 A1 | 11/2008 | Carlson |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0079388 A1 | 2/2009 | Reddy |
| 2009/0078775 A1 | 3/2009 | Giebel et al. |
| 2009/0095047 A1 | 4/2009 | Patel et al. |
| 2009/0114716 A1 | 5/2009 | Ramachandran |
| 2009/0132813 A1 | 5/2009 | Schibuk |
| 2009/0145727 A1 | 6/2009 | Johns |
| 2009/0156199 A1 | 6/2009 | Steenstra et al. |
| 2009/0160668 A1 | 6/2009 | Crowley et al. |
| 2009/0177319 A1 | 7/2009 | Garibaldi et al. |
| 2009/0184865 A1 | 7/2009 | Valo et al. |
| 2009/0187491 A1 | 7/2009 | Bull et al. |
| 2009/0190142 A1 | 7/2009 | Taylor et al. |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0248883 A1 | 10/2009 | Suryanarayana et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2009/0322706 A1 | 12/2009 | Austin |
| 2010/0005004 A1 | 1/2010 | Hudak et al. |
| 2010/0051695 A1 | 3/2010 | Yepez et al. |
| 2010/0063894 A1 | 3/2010 | Lundy |
| 2010/0088192 A1 | 4/2010 | Bowles et al. |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0169231 A1 | 7/2010 | Bowles et al. |
| 2010/0174596 A1 | 7/2010 | Gilman |
| 2010/0185506 A1 | 7/2010 | Wolff |
| 2010/0219234 A1 | 9/2010 | Forbes |
| 2010/0228676 A1 | 9/2010 | Librizzi et al. |
| 2010/0235198 A1 | 9/2010 | Fini et al. |
| 2010/0237854 A1 | 9/2010 | Kumhyr et al. |
| 2010/0260271 A1 | 10/2010 | Kapoor |
| 2010/0262481 A1 | 10/2010 | Baker et al. |
| 2010/0312639 A1 | 12/2010 | Mastronardi |
| 2011/0035322 A1 | 2/2011 | Lively |
| 2011/0043628 A1 | 2/2011 | Yun |
| 2011/0047022 A1 | 2/2011 | Walker |
| 2011/0055322 A1 | 3/2011 | Gregersen |
| 2011/0060641 A1 | 3/2011 | Grossman et al. |
| 2011/0066514 A1 | 3/2011 | Maraz |
| 2011/0067520 A1 | 3/2011 | Ihrke et al. |
| 2011/0082734 A1 | 4/2011 | Zhang et al. |
| 2011/0113479 A1 | 5/2011 | Ganem |
| 2011/0173576 A1 | 7/2011 | Murphy et al. |
| 2011/0191861 A1 | 8/2011 | Spears |
| 2011/0235853 A1 | 9/2011 | Bowles et al. |
| 2011/0313840 A1 | 12/2011 | Mason et al. |
| 2012/0004761 A1 | 1/2012 | Madruga |
| 2012/0030097 A1 | 2/2012 | Hagan et al. |
| 2012/0063501 A1 | 3/2012 | Aguren |
| 2012/0191562 A1 | 7/2012 | Bowles et al. |
| 2012/0209783 A1 | 8/2012 | Smith et al. |
| 2012/0246083 A1 | 9/2012 | Bowles |
| 2012/0254046 A1 | 10/2012 | Librizzi et al. |
| 2012/0294490 A1 | 11/2012 | Bowles et al. |
| 2013/0046611 A1 | 2/2013 | Bowles et al. |
| 2013/0046699 A1 | 2/2013 | Bowles et al. |
| 2013/0124426 A1 | 5/2013 | Bowles et al. |
| 2013/0137376 A1 | 5/2013 | Fitzgerald et al. |
| 2013/0144797 A1 | 6/2013 | Bowles et al. |
| 2013/0191236 A1 | 7/2013 | Bowles |
| 2013/0198089 A1 | 8/2013 | Bowles |
| 2013/0198144 A1 | 8/2013 | Bowles |
| 2013/0226679 A1 | 8/2013 | Bowles |
| 2013/0275314 A1 | 10/2013 | Bowles |
| 2013/0284805 A1 | 10/2013 | Kraft et al. |
| 2014/0156883 A1 | 6/2014 | Bowles |
| 2015/0066677 A1 | 3/2015 | Bowles et al. |
| 2015/0293860 A9 | 10/2015 | Bowles |
| 2015/0317619 A1 | 11/2015 | Curtis |
| 2016/0091549 A1 | 3/2016 | Snook et al. |
| 2016/0092849 A1 | 3/2016 | Cirannek et al. |
| 2016/0098688 A1 | 4/2016 | Hunt et al. |
| 2016/0098689 A1 | 4/2016 | Bowles et al. |
| 2016/0125367 A1 | 5/2016 | Bowles et al. |
| 2016/0125548 A1 | 5/2016 | Bowles et al. |
| 2016/0132840 A1 | 5/2016 | Bowles et al. |
| 2016/0171456 A1 | 6/2016 | Bowles et al. |
| 2016/0171544 A1 | 6/2016 | Heminger et al. |
| 2016/0171575 A1 | 6/2016 | Bowles et al. |
| 2016/0210648 A1 | 7/2016 | Cirannek et al. |
| 2016/0275460 A1 | 9/2016 | Ploetner et al. |
| 2016/0275518 A1 | 9/2016 | Bowles et al. |
| 2016/0284019 A1 | 9/2016 | Bowles et al. |
| 2016/0328684 A1 | 11/2016 | Bowles et al. |
| 2016/0379287 A1 | 12/2016 | Dabiri |
| 2017/0083886 A1 | 3/2017 | Silva et al. |
| 2017/0169401 A1 | 6/2017 | Beane et al. |
| 2017/0286920 A1 | 10/2017 | Silva et al. |
| 2017/0286921 A1 | 10/2017 | Bowles |
| 2017/0301010 A1 | 10/2017 | Bowles et al. |
| 2017/0301035 A1 | 10/2017 | Bowles et al. |
| 2017/0301078 A1 | 10/2017 | Forutanpour et al. |
| 2017/0330158 A1 | 11/2017 | Librizzi et al. |
| 2017/0356857 A1 | 12/2017 | Forutanpour et al. |
| 2017/0372273 A1 | 12/2017 | Bowles et al. |
| 2017/0372465 A1 | 12/2017 | Forutanpour et al. |
| 2018/0130136 A1 | 5/2018 | Bowles et al. |
| 2018/0247280 A1 | 8/2018 | Bowles et al. |
| 2018/0255047 A1 | 9/2018 | Cicchitto |
| 2018/0260794 A1 | 9/2018 | Bowles et al. |
| 2019/0325530 A1 | 10/2019 | Bowles et al. |
| 2020/0020091 A1 | 1/2020 | Forutanpour et al. |
| 2020/0090137 A1 | 3/2020 | Bowles et al. |
| 2020/0126046 A1 | 4/2020 | Bowles |
| 2020/0151677 A1 | 5/2020 | Bowles et al. |
| 2020/0151679 A1 | 5/2020 | Hunt et al. |
| 2020/0202319 A1 | 6/2020 | Forutanpour et al. |
| 2020/0258343 A1 | 8/2020 | Forutanpour et al. |
| 2020/0259300 A1 | 8/2020 | Forutanpour et al. |
| 2020/0265487 A1 | 8/2020 | Forutanpour et al. |
| 2020/0342442 A1 | 10/2020 | Curtis |
| 2021/0035206 A1 | 2/2021 | Bowles et al. |
| 2021/0174312 A1 | 6/2021 | Bowles et al. |
| 2021/0192484 A1 | 6/2021 | Forutanpour et al. |
| 2021/0295494 A1 | 9/2021 | Forutanpour et al. |
| 2022/0027879 A1 | 1/2022 | Bowles et al. |
| 2022/0051212 A1 | 2/2022 | Forutanpour et al. |
| 2022/0051300 A1 | 2/2022 | Forutanpour et al. |
| 2022/0051301 A1 | 2/2022 | Forutanpour et al. |

(56) References Cited

U.S. PATENT DOCUMENTS

| | | |
|---|---|---|
| 2022/0051507 A1 | 2/2022 | Forutanpour et al. |
| 2022/0067798 A1 | 3/2022 | Forutanpour et al. |
| 2022/0068076 A1 | 3/2022 | Forutanpour et al. |
| 2022/0114854 A1 | 4/2022 | Forutanpour et al. |
| 2022/0172178 A1 | 6/2022 | Forutanpour et al. |
| 2022/0198407 A1 | 6/2022 | Beane et al. |
| 2022/0284406 A1 | 9/2022 | Hunt et al. |
| 2022/0292464 A1 | 9/2022 | Silva et al. |
| 2022/0318774 A1 | 10/2022 | Bowles |
| 2023/0007937 A1 | 1/2023 | Forutanpour et al. |
| 2023/0077844 A1 | 3/2023 | Bowles et al. |
| 2023/0100849 A1 | 3/2023 | Bowles et al. |
| 2023/0196865 A1 | 6/2023 | Forutanpour et al. |
| 2023/0238751 A1 | 7/2023 | Forutanpour et al. |
| 2023/0259910 A1 | 8/2023 | Forutanpour et al. |
| 2023/0274346 A1 | 8/2023 | Bowles et al. |
| 2023/0297973 A1 | 9/2023 | Bowles et al. |
| 2023/0297974 A1 | 9/2023 | Bowles et al. |
| 2023/0306384 A1 | 9/2023 | Bowles et al. |
| 2023/0394904 A1 | 12/2023 | Forutanpour et al. |
| 2024/0144461 A1 | 5/2024 | Forutanpour et al. |
| 2024/0185317 A1 | 6/2024 | Forutanpour et al. |
| 2024/0249251 A1 | 7/2024 | Bowles |
| 2024/0249321 A1 | 7/2024 | Forutanpour et al. |
| 2024/0265364 A1 | 8/2024 | Forutanpour et al. |
| 2024/0265470 A1 | 8/2024 | Bowles et al. |

FOREIGN PATENT DOCUMENTS

| | | |
|---|---|---|
| CN | 1365479 | 8/2002 |
| CN | 1574437 | 2/2005 |
| CN | 2708415 | 7/2005 |
| CN | 1864088 | 11/2006 |
| CN | 1957320 | 5/2007 |
| CN | 2912132 | 6/2007 |
| CN | 200965706 | 10/2007 |
| CN | 101176124 | 5/2008 |
| CN | 101379488 A | 3/2009 |
| CN | 102246384 | 11/2011 |
| DE | 10031532 | 10/2001 |
| EP | 0116970 | 12/1991 |
| EP | 0654003 | 5/1995 |
| EP | 1168253 | 1/2002 |
| EP | 1270905 | 1/2003 |
| EP | 1703436 | 9/2006 |
| EP | 3255753 | 12/2017 |
| EP | 2428072 | 1/2018 |
| GB | 2167553 | 5/1986 |
| JP | H7112801 | 5/1995 |
| JP | H7334583 | 12/1995 |
| JP | H11242005 | 9/1999 |
| JP | H11334851 | 12/1999 |
| JP | 2000121564 | 4/2000 |
| JP | 2000171409 A | 6/2000 |
| JP | 2000180371 | 6/2000 |
| JP | 3123095 | 1/2001 |
| JP | 2001312766 | 11/2001 |
| JP | 2002019147 | 1/2002 |
| JP | 2002183286 | 6/2002 |
| JP | 2002259528 | 9/2002 |
| JP | 2002302252 | 10/2002 |
| JP | 2002324264 | 11/2002 |
| JP | 2002358354 | 12/2002 |
| JP | 2003139516 | 5/2003 |
| JP | 2003230229 | 8/2003 |
| JP | 2003242243 | 8/2003 |
| JP | 2003264007 | 9/2003 |
| JP | 2003267509 | 9/2003 |
| JP | 2004021569 | 1/2004 |
| JP | 2004191496 | 7/2004 |
| JP | 2004226129 | 8/2004 |
| JP | 2004239850 | 8/2004 |
| JP | 2004288143 | 10/2004 |
| JP | 2004303102 | 10/2004 |
| JP | 2004341681 | 12/2004 |
| JP | 2005063203 | 3/2005 |
| JP | 2005122059 | 5/2005 |
| JP | 2005308476 | 11/2005 |
| JP | 2006127308 | 5/2006 |
| JP | 2006195814 | 7/2006 |
| JP | 2006203451 | 8/2006 |
| JP | 2006227764 | 8/2006 |
| JP | 2006260246 | 9/2006 |
| JP | 2007141266 | 6/2007 |
| JP | 2007155455 | 6/2007 |
| JP | 2007179516 | 7/2007 |
| JP | 2007265340 | 10/2007 |
| JP | 2008045959 | 2/2008 |
| JP | 2008059403 | 3/2008 |
| JP | 2008522299 | 6/2008 |
| JP | 2008293391 | 12/2008 |
| JP | 2007086725 | 4/2009 |
| JP | 2009175035 | 8/2009 |
| JP | 2009245058 | 10/2009 |
| JP | 2009250971 | 10/2009 |
| JP | 2009290852 | 12/2009 |
| JP | 2010177720 | 8/2010 |
| JP | 2010276896 | 12/2010 |
| JP | 2011518387 | 6/2011 |
| JP | 2012504832 | 2/2012 |
| KR | 20000064168 | 11/2000 |
| KR | 20010074614 | 8/2001 |
| KR | 20010097567 | 11/2001 |
| KR | 100766860 | 10/2007 |
| WO | 8503790 | 8/1985 |
| WO | 2001015096 | 3/2001 |
| WO | 2002005176 | 1/2002 |
| WO | 221090 | 3/2002 |
| WO | 2002025613 | 3/2002 |
| WO | 2002039357 | 5/2002 |
| WO | 2003012717 | 2/2003 |
| WO | 2003014994 | 2/2003 |
| WO | 2004021114 | 3/2004 |
| WO | 2004114490 | 12/2004 |
| WO | 2005008566 | 1/2005 |
| WO | 2005054877 | 6/2005 |
| WO | 2005101346 | 10/2005 |
| WO | 2006058601 | 6/2006 |
| WO | 2006080851 | 8/2006 |
| WO | 2007066166 | 6/2007 |
| WO | 2009089607 | 7/2009 |
| WO | 2009128173 | 10/2009 |
| WO | 2009128176 | 10/2009 |
| WO | 2009129526 | 10/2009 |
| WO | 2010040116 | 4/2010 |
| WO | 2010128267 | 11/2010 |
| WO | 2010128315 | 11/2010 |

OTHER PUBLICATIONS

3GPP Organizational Partners, "3rd Generation Partnership Project; Technical Specification Group Terminals; AT command set for GSM Mobile Equipment (ME)," Global System for Mobile Commmunications, 1998, 124 pages.

Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.

Altec Lansing User's Guide 2007, 8 pages.

Bhule et al., "Environmental and economic trade-offs in consumer electronic products recycling: a case study of cell phones and computers," IEEE International Symposium on Electronics and the Environment, Conference Record, 2004.

Bournique, D.: "Mobile Karma Shuts Down As iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.

Business Wire, "The World's First Office Photography Machine" at CES 2008 Launched by Ortery Technologies, Jan. 7, 2008, 3 pages.

CNET, "Tackling LCD "burn ins", and dead/stick Pixels", published Sep. 2, 2009, retrieved from http://www.cnet.com/news/tackling-LCD-burn-ins-and-deadstuck-pixels/.

(56) References Cited

OTHER PUBLICATIONS

Cybercom Group Europe AB, "OMSI Forum," Downloads, 2005, 2 pages.
Cybercom Group Europe AB, "OMSI Provides Easy Service and Maintenance for Mobile Phones," Press Release, 2005, 1 page.
Cybercom Group Europe AB, "The OMSI 2.0 Interface Supports," OMSI 2.0 Description, available at least before Oct. 2008, 1 page.
Cybercom Group, "Leading Telecom Organisations Address Device Management Issues," Press Release, 2007, 1 page.
Evgenii Masunov, Mar. 25, 2010, http://www.appleinsider.ru/news/ipone-obladaet-luchshim-tachskrinom-provereno_robotom.html, 4 pages.
Foster et al., "Automated Visual Inspection: A Tutorial" 1990 Computers Ind. Engng. vol. 18(4):493-504.
Geekanoids, You Tube Video, "Apple iphone 3GS Unboxing and Review", uploaded on Jun. 19, 2009, retrieved from http://www.youtube.com/watch?v=GCEi9QAeDqk on Sep. 2, 2009.
Geyer et al. "The economics of cell phone reuse and recylcing," The International Journal of Advanced Manufacturing Technology, 47(5): 515-525, 2010.
Graffia et al., "Retail Station for E-Device Identification, Assessment, and Trade-In", Jun. 6, 2014 (Drawings and Specification) (Year: 2014).
Watson; "Review: SanDisk iXpand Wireless Charger" Sep. 15, 2019, 4 pages retrieved at https://www.whatmobile.net/Reviews/article/review-sandisk-ixpand-wireless-charger.
GSM Arena Glossary, "LCD (Liquid Crystal Display", retrieved from http://www.gsmarena.com/glossary.php3?term=lcd on Apr. 28, 2016, 1 page.
Hazelwood, et al.; "Life Extension of Electronic Products: A Case Study of Smartphones", Sep. 20, 2021, IEEE Access, vol. 9, pp. 144726-144739, DOI: 10.1109/ACCESS.2021.3121733.
Hassan, et al.; "A Novel Cascaded Deep Neural Network for Analyzing Smart Phone Data for Indoor Localization", Dec. 2019, vol. 101, pp. 760-769, Future Generation Computer Systems.
International Numbering Plan. Retrieved on Apr. 5, 2013 at <http://web.archive.org/web/20070322214125/http://www.numberingplans.com/?page+analysis&sub+imeinr>, 2 pages.
Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].
Kanter, James Max, "Color Crack:Identifying Cracks in Glass," dated Dec. 9, 2014; retrieved from the internet http://www.jmaxkanter.com/static/papers/color_crack.pdf on Sep. 22, 2017.
Park, et. al., "Ambiguous Surface Defect Image Classification of AMOLED Displays in Smartphones", Jan. 26, 2016, IEEE Transactions on Industrial Informatics, vol. 12, Issue 2, pp. 597-607, DOI: 10.1109/TII.2016.2522191.
Lambert, Emily, "Use It Up, Wear It Out", Forbes 175.5 (2005): 77-78. Business Source Complete. Web. Jan. 6, 2015, 3 pages.
Littleton Partners with Donations Ink (2006, Jan. 19) US Fed News Service, Including US State News. Web. Jan. 6, 2015, 1 page.
Mobilegazette.com, "2006 in Review: The Good, The Bad and The Ugly", published Dec. 2006, retrieved from http://www.mobilegazette.com/2006-review-06x12x22.htm on Nov. 11, 2015.
Kuriyan, et al.: "Review of Research on Rural PC Kiosks," Apr. 14, 2007, 22 pages, retrieved at http://research.microsoft.com/research/tem/kiosks.
Oliveira, et al., "Automatic crack detection on road imagery using anisotropic diffusion and region linkage," 18th European Signal Processing Conference (EUSIPCO—2010), Aug. 23, 2010, pp. 274-278.
Novotny, et al.; "Smart City Concept, Applications and Services," Aug. 26, 2014, Journal of Telecommunications System & Management, vol. 3, Issue 2, pp. 1-8, DOI: 10.4172/2167-0919.1000117.

PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Journal of the Chinese Institute of Industrial Engineers, vol. 24, No. 5, pp. 341-350 (2007).
Phifer, "How to Use your 3G Phone as a Wireless Broad Band Modem," Computer Weekly News, 2007, 6 pages.
Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk", Jun. 1997, Computer Vision and Pattern Recognition, pp. 690-696.
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
Romano "Recycling a Phone at EcoATM is an Easy Route To Feeling Green," Xconomy, Jan. 22, 2014, pp. 1-3.
Rosebrock, "How to Build a Kick-Ass Mobile Document Scanner in Just 5 Minutes" PyImage Search, Sep. 2014, 19 pages.
Shotton et al., "Efficiently Combining Contour and Texture Cues for Object Recognition", Proceedings of the British Machine Vision Conference 2008, (Sep. 1, 2008), pp. 7.1-7.10 * abstract *.
Shue, Jiuh-Biing et al. "Extended consumer responsibility: Syncretic value-oriented pricing strategies for trade-in-for-upgrade programs" Transportation Research Part E: Logistics and Transportation Review 122 (2019) 350-367.
SimplySellular, "Get Cash for your Old Cell Phone", published Apr. 2, 2010, retrieved from http://simplysellular.com/conditions.php on Jan. 6, 2015, 2 pages.
Sony Ericsson Mobile Communications Ab, "P800/P802," White Paper, 2003, 128 pages.
Sony Ericsson Mobile Communications AB, "T68i/T68ie," White Paper, 2002, 71 pages.
Tecace Software: "Your phone appraisal—Movaluate—Android Apps on Google Play", Android Apps On Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Tech Spurt; Sandisk iXpand Review, Wireless Charger & Auto Photo Backup!, Aug. 21, 2019, 1 page, retrieved at https://www.youtube.com/watch?v=zemKQ6xULww.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).
Grose, Thomas; "New Life for Old Phones," ASE Prism 22.3 (2012): 18.
Waugh, "Phone recycling machine lets you drop in old mobiles—and spits out cash instantly," Daily Mail Online, Jan. 13, 2012, p. 1-2.
Wikipedia, "Machine Vision" Sep. 19, 2009, 6 pages.
Wiley Encyclopedia of Computer Science and Technology, Nov. 2008, 2362 pages, Wiley-interscience, ISBN-10: 0471383937, ISBN-13: 978-0471383932.
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Wu, "Overview of Wireless Power and Data Communication" WPC/QI Developers Forum, Oct. 29, 2016, 21 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Zhang, Yiyang, "The design of glass crack detection system based on image preprocessing technology," 2014 IEEE 7th Joint Interna-

(56) References Cited

OTHER PUBLICATIONS tional Information Technology and Artificial Intelligence Conference, IEEE, Dec. 20, 2014; pp. 39-42.
PCT International Search Report mailed Feb. 10, 2010 for PCT Application No. PCT/US2009/059461, filed Feb. 3, 2010.
Non-Final Office Action mailed Aug. 2, 2010 in U.S. Appl. No. 12/727,624, 10 pages.
Non-Final Office Action Response filed Aug. 23, 2010 in U.S. Appl. No. 12/727,624, 19 pages.
Final Office Action mailed Oct. 1, 2010 in U.S. Appl. No. 12/727,624, 11 pages.
Final Office Action Response filed Nov. 2, 2010 in U.S. Appl. No. 12/727,624, 7 pages.
Notice of Allowance mailed Dec. 20, 2010 in U.S. Appl. No. 12/727,624, 80 pages.
Non-Final Office Action mailed Oct. 11, 2011 in U.S. Appl. No. 12/573,089, 17 pages.
PCT International Search Report mailed Nov. 30, 2011 for PCT Application No. PCT/US2011/028251, filed Mar. 13, 2011.
Non-Final Office Action Response filed Jan. 11, 2012 in U.S. Appl. No. 12/573,089, 11 pages.
Final Office Action mailed Jan. 24, 2012 in U.S. Appl. No. 12/573,089, 17 pages.
Non-Final Office Action mailed Mar. 26, 2012 in U.S. Appl. No. 13/017,560, 10 pages.
Non-Final Office Action mailed Mar. 27, 2012 in U.S. Appl. No. 12/785,465, 15 pages.
Final Office Action Response filed Mar. 28, 2012 in U.S. Appl. No. 12/573,089, 12 pages.
Non-Final Office Action Response filed Mar. 29, 2012 in U.S. Appl. No. 13/017,560, 14 pages.
Non-Final Office Action Response filed Mar. 29, 2012 in U.S. Appl. No. 12/785,465, 16 pages.
PCT International Search Report for PCT Application No. PCT/US2012/032042, filed Apr. 4, 2012.
Notice of Allowance mailed Apr. 11, 2012 in U.S. Appl. No. 12/785,465, 18 pages.
Notice of Allowance mailed Apr. 12, 2012 in U.S. Appl. No. 12/573,089, 10 pages.
Notice of Allowance mailed Jul. 5, 2012 in U.S. Appl. No. 13/017,560, 7 pages.
Non-Final Office Action mailed Dec. 10, 2012 in U.S. Appl. No. 13/562,292, 8 pages.
Non-Final Office Action Response filed Dec. 29, 2012 in U.S. Appl. No. 13/562,292, 16 pages.
Non-Final Office Action mailed Jan. 8, 2013 in U.S. Appl. No. 13/487,299, 15 pages.
Non-Final Office Action mailed Jan. 15, 2013 in U.S. Appl. No. 13/492,835, 17 pages.
Notice of Allowance mailed Jan. 24, 2013 in U.S. Appl. No. 13/562,292, 8 pages.
PCT International Search Report mailed Jan. 31, 2013 for PCT Application No. PCT/US2012/061587, filed Oct. 24, 2012.
Non-Final Office Action mailed Mar. 28, 2013 in U.S. Appl. No. 13/438,924, 20 pages.
Non-Final Office Action Response filed Apr. 8, 2013 in U.S. Appl. No. 13/487,299, 12 pages.
Non-Final Office Action mailed Apr. 11, 2013 in U.S. Appl. No. 13/658,825, 20 pages.
Notice of Allowance mailed May 6, 2013 in U.S. Appl. No. 13/487,299, 9 pages.
Non-Final Office Action Response filed May 15, 2013 in U.S. Appl. No. 13/492,835, 14 pages.
Final Office Action mailed May 31, 2013 in U.S. Appl. No. 13/492,835, 18 pages.
PCT International Search Report mailed Jun. 14, 2013 for PCT Application No. PCT/US2013/023717, filed Jan. 30, 2013.
Non-Final Office Action mailed Jul. 15, 2013 in U.S. Appl. No. 13/705,252, 29 pages.
Non-Final Office Action mailed Jul. 29, 2013 in U.S. Appl. No. 13/862,395, 19 pages.
Non-Final Office Action mailed Aug. 12, 2013 in U.S. Appl. No. 13/733,984, 31 pages.
Non-Final Office Action Response filed Aug. 28, 2013 in U.S. Appl. No. 13/438,924, 20 pages.
Non-Final Office Action Response filed Sep. 10, 2013 in U.S. Appl. No. 13/658,825, 17 pages.
Non-Final Office Action Response filed Dec. 13, 2013 in U.S. Appl. No. 13/705,252, 20 pages.
Final Office Action Response filed Dec. 26, 2013 in U.S. Appl. No. 13/113,497, 8 pages.
Non-Final Office Action Response filed Dec. 27, 2013 in U.S. Appl. No. 13/862,395, 14 pages.
Non-Final Office Action Response filed Jan. 12, 2014 in U.S. Appl. No. 13/733,984, 15 pages.
Final Office Action mailed Mar. 24, 2014 in U.S. Appl. No. 13/438,924, 32 pages.
PCT International Search Report and Written Opinion mailed Apr. 3, 2014 for PCT Application No. PCT/US2013/072697, filed Dec. 2, 2013, 7 pages.
Final Office Action mailed Apr. 3, 2014 in U.S. Appl. No. 13/658,825, 28 pages.
Final Office Action mailed Apr. 9, 2014 in U.S. Appl. No. 13/862,395, 26 pages.
Non-Final Office Action mailed May 6, 2014 in U.S. Appl. No. 13/733,984, 33 pages.
PCT International Search Report and Written Opinion mailed Jul. 18, 2014 for PCT Application No. PCT/US2014/024551, pp. all.
Final Office Action Response filed Aug. 21, 2014 in U.S. Appl. No. 13/438,924, 26 pages.
Final Office Action Response filed Oct. 3, 2014 in U.S. Appl. No. 13/658,825, 26 pages.
Non-Final Office Action Response filed Oct. 6, 2014 in U.S. Appl. No. 13/733,984, 20 pages.
Final Office Action Response filed Oct. 9, 2014 in U.S. Appl. No. 13/862,395, 18 pages.
Non-Final Office Action mailed Dec. 4, 2014 in U.S. Appl. No. 13/794,814, 22 pages.
Non-Final Office Action mailed Jan. 23, 2015 in U.S. Appl. No. 13/492,835, 22 pages.
Final Office Action mailed Jan. 30, 2015 in U.S. Appl. No. 13/733,984, 35 pages.
Non-Final Office Action Response filed Mar. 4, 2015 in U.S. Appl. No. 13/794,814, 17 pages.
Non-Final Office Action mailed Mar. 6, 2015 in U.S. Appl. No. 13/862,395, 29 pages.
Non-Final Office Action mailed Apr. 13, 2015 in U.S. Appl. No. 13/693,032, 15 pages.
Non-Final Office Action Response filed May 26, 2015 in U.S. Appl. No. 13/492,835, 16 pages.
Non-Final Office Action Response filed Jun. 8, 2015 in U.S. Appl. No. 13/862,395, 16 pages.
Non-Final Office Action mailed Jul. 7, 2015 in U.S. Appl. No. 13/753,539, 29 pages.
Final Office Action Response filed Jul. 30, 2015 in U.S. Appl. No. 13/733,984, 21 pages.
Non-Final Office Action Response filed Aug. 11, 2015 in U.S. Appl. No. 13/693,032, 18 pages.
Non-Final Office Action mailed Aug. 28, 2015 in U.S. Appl. No. 13/792,030, 19 pages.
Non-Final Office Action mailed Sep. 10, 2015 in U.S. Appl. No. 13/492,835, 43 pages.
Final Office Action mailed Sep. 18, 2015 in U.S. Appl. No. 13/862,395, 29 pages.
Non-Final Office Action mailed Sep. 24, 2015 in U.S. Appl. No. 13/438,924, 56 pages.
Non-Final Office Action Response filed Nov. 9, 2015 in U.S. Appl. No. 13/753,539, 28 pages.
Non-Final Office Action mailed Nov. 20, 2015 in U.S. Appl. No. 13/658,825, 51 pages.
Non-Final Office Action Response filed Dec. 28, 2015 in U.S. Appl. No. 13/792,030, 18 pages.

(56) References Cited

OTHER PUBLICATIONS

Non-Final Office Action mailed Jan. 5, 2016 in U.S. Appl. No. 13/705,252, 37 pages.
Non-Final Office Action Response filed Jan. 11, 2016 in U.S. Appl. No. 13/492,835, 26 pages.
Final Office Action Response filed Jan. 19, 2016 in U.S. Appl. No. 13/862,395, 24 pages.
Final Office Action mailed Feb. 12, 2016 in U.S. Appl. No. 13/753,539, 30 pages.
Office Action mailed Feb. 25, 2016 in U.S. Appl. No. 13/794,816, 76 pages.
Non-Final Office Action Response filed Mar. 18, 2016 in U.S. Appl. No. 13/658,825, 23 pages.
Non-Final Office Action Response filed Mar. 24, 2016 in U.S. Appl. No. 13/438,924, 36 pages.
Final Office Action mailed May 6, 2016 in U.S. Appl. No. 13/492,835, 32 pages.
Office Action mailed May 31, 2016 in U.S. Appl. No. 13/658,828, 63 pages.
Final Office Action mailed Jun. 30, 2016 in U.S. Appl. No. 13/658,825, 23 pages.
Office Action mailed Jul. 11, 2016 in U.S. Appl. No. 13/794,814, 21 pages.
Non-Final Office Action Response filed Aug. 5, 2016 in U.S. Appl. No. 13/794,816, 38 pages.
Non-Final Office Action mailed Nov. 30, 2016 in U.S. Appl. No. 13/693,032, 14 pages.
Non-Final Office Action Response as Appeal Brief Dec. 2, 2016 in U.S. Appl. No. 13/794,814, 9 pages.
Non-Office Action mailed Mar. 3, 2017 in U.S. Appl. No. 13/913,408, 29 pages.
Notice of Allowance mailed Jul. 5, 2017 in U.S. Appl. No. 13/862,395, 9 pages.
Final Office Action mailed Jul. 11, 2017 in U.S. Appl. No. 13/438,924, 19 pages.
Notice of Allowance mailed Jul. 13, 2017 in U.S. Appl. No. 13/792,030, 9 pages.
Non-Final Office Action Response filed Aug. 11, 2017 in U.S. Appl. No. 13/913,408, 25 pages.
Non-Final Office Action mailed Sep. 1, 2017 in U.S. Appl. No. 15/630,460, 23 pages.
Non-Final Office Action mailed Sep. 1, 2017 in U.S. Appl. No. 15/641,145, 20 pages.
Non-Final Office Action mailed Sep. 5, 2017 in U.S. Appl. No. 15/641,122, 7 pages.
Non-Final Office Action Response filed Sep. 6, 2017 in U.S. Appl. No. 15/641,122, 16 pages.
Notice of Allowance mailed Sep. 27, 2017 in U.S. Appl. No. 15/641,122, 5 pages.
Non-Final Office Action mailed Oct. 10, 2017 in U.S. Appl. No. 15/672,157, 18 pages.
Notice of Allowance mailed Oct. 12, 2017 in U.S. Appl. No. 15/641,122, 2 pages.
Final Office Action mailed Nov. 2, 2017 in U.S. Appl. No. 13/794,816, 75 pages.
Non-Final Office Action Response filed Nov. 29, 2017 in U.S. Appl. No. 15/630,460, 16 pages.
Non-Final Office Action Response filed Nov. 29, 2017 in U.S. Appl. No. 15/641,145, 13 pages.
Notice of Allowance mailed Dec. 14, 2017 in U.S. Appl. No. 13/792,030, 5 pages.
Non-Final Office Action Response filed Jan. 10, 2018 in U.S. Appl. No. 15/672,157, 32 pages.
Notice of Allowance mailed Jan. 11, 2018 in U.S. Appl. No. 13/862,395, 6 pages.
Final Office Action mailed Feb. 1, 2018 in U.S. Appl. No. 15/630,460, 47 pages.
Final Office Action mailed Mar. 22, 2018 in U.S. Appl. No. 15/641,145, 20 pages.
Notice of Allowance mailed Apr. 12, 2018 in U.S. Appl. No. 13/913,408, 21 pages.
Notice of Allowance mailed May 2, 2018 in U.S. Appl. No. 13/438,924, 11 pages.
Non-Final Office Action mailed May 10, 2018 in U.S. Appl. No. 15/811,501, 6 pages.
Final Office Action Response as Appeal Brief filed Jun. 19, 2018 in U.S. Appl. No. 15/630,460, 24 pages.
Non-Final Office Action Response filed Jul. 3, 2018 in U.S. Appl. No. 15/811,501, 16 pages.
Notice of Allowance mailed Aug. 16, 2018 in U.S. Appl. No. 15/811,501, 5 pages.
Examiner's Answer to Appeal Briefs dated Sep. 28, 2018 in U.S. Appl. No. 15/630,460, 16 pages.
Non-Final Office Action mailed Apr. 8, 2019 in U.S. Appl. No. 15/214,791, 31 pages.
Non-Final Office Action mailed Jul. 8, 2019 in U.S. Appl. No. 15/091,487, 31 pages.
Non-Final Office Action mailed Oct. 2, 2019 in U.S. Appl. No. 15/672,157, 14 pages.
Non-Final Office Action mailed Oct. 25, 2019 in U.S. Appl. No. 16/195,785, 6 pages.
Non-Final Office Action Response filed Nov. 6, 2019 in U.S. Appl. No. 15/091,487, 20 pages.
Non-Final Office Action Response filed Jan. 23, 2020 in U.S. Appl. No. 16/195,785, 10 pages.
Final Office Action mailed Jan. 29, 2020 in U.S. Appl. No. 15/091,487, 24 pages.
Supplemental Appeal Brief filed Apr. 9, 2020 in U.S. Appl. No. 15/630,460, 4 pages.
Non-Final Office Action mailed Jun. 2, 2020 in U.S. Appl. No. 16/195,785, 8 pages.
Final Office Action Response filed Jun. 29, 2020 in U.S. Appl. No. 15/091,487, 15 pages.
Non-Final Office Action Response as Appeal Brief filed Jul. 2, 2020 in U.S. Appl. No. 15/672,157, 33 pages.
Notice of Allowance mailed Jul. 6, 2020 in U.S. Appl. No. 15/630,460, 8 pages.
Notice of Allowance mailed Aug. 3, 2020 in U.S. Appl. No. 15/091,487, 20 pages.
Non-Final Office Action mailed Oct. 1, 2020 in U.S. Appl. No. 15/901,526, 24 pages.
Notice of Allowance mailed Oct. 15, 2020 in U.S. Appl. No. 15/672,157, 13 pages.
Non-Final Office Action Response filed Oct. 30, 2020 in U.S. Appl. No. 16/195,785, 14 pages.
Notice of Allowance mailed Nov. 13, 2020 in U.S. Appl. No. 16/195,785, 6 pages.
Non-Final Office Action mailed Jan. 7, 2021 in U.S. Appl. No. 15/977,729, 15 pages.
Notice of Allowance mailed Feb. 24, 2021 in U.S. Appl. No. 16/195,785, 6 pages.
Notice of Allowance mailed Mar. 31, 2021 in U.S. Appl. No. 15/672,157, 13 pages.
Notice of Allowance mailed May 27, 2021 in U.S. Appl. No. 15/901,526, 8 pages.
Non-Final Office Action response filed Jun. 7, 2021 in U.S. Appl. No. 15/977,729, 16 pages.
Final Office Action mailed Sep. 28, 2021 in U.S. Appl. No. 15/977,729, 31 pages.
Non-Final Office Action mailed Oct. 15, 2021 in U.S. Appl. No. 17/072,012, 25 pages.
Final Office Action Response filed Jan. 27, 2022 U.S. Appl. No. 15/977,729, 16 pages.
Non-Final Office Action Response filed Feb. 15, 2022 in U.S. Appl. No. 17/072,012, 13 pages.
Notice of Allowance, mailed Mar. 21, 2022 in U.S. Appl. No. 15/977,729, 11 pages.
Notice of Allowance, mailed May 20, 2022 in U.S. Appl. No. 17/072,012, 9 pages.
Notice of Allowance, mailed Jul. 7, 2022, in U.S. Appl. No. 15/977,729, 7 pages.

(56) References Cited

OTHER PUBLICATIONS

Notice of Allowance, mailed Oct. 20, 2022 in U.S. Appl. No. 17/072,012, 10 pages.
Non-Final Office Action mailed Dec. 23, 2022 in U.S. Appl. No. 17/394,255, 24 pages.
Restriction Requirement mailed Feb. 6, 2023 in U.S. Appl. No. 17/225,932, 6 pages.
Non-Final Office Action response filed Jun. 22, 2023 in U.S. Appl. No. 17/394,255, 17 pages.
Non-Final Office Action mailed Jun. 28, 2023 in U.S. Appl. No. 17/225,932, 7 pages.
Notice of Allowance mailed Aug. 14, 2023 in U.S. Appl. No. 17/394,255, 10 pages.
Non-Final Office Action mailed Aug. 17, 2023 in U.S. Appl. No. 18/323,303, 28 pages.
Non-Final Office Action mailed Sep. 14, 2023 in U.S. Appl. No. 18/051,512, pp. all.
Non-Final Office Action mailed Oct. 13, 2023 in U.S. Appl. No. 15/977,729, 60 pages.
Non-Final Office Action Response filed Jan. 15, 2024 in U.S. Appl. No. 18/051,512, pp. all.
Non-Final Office Action Response filed Mar. 13, 2024 in U.S. Appl. No. 15/977,729.
Notice of Allowance mailed Apr. 3, 2024 in U.S. Appl. No. 17/815,205, 9 pages.
Final Office Action mailed Apr. 5, 2024 in U.S. Appl. No. 18/051,512, pp. all.
Notice of Allowance mailed Aug. 7, 2024 in U.S. Appl. No. 17/815,205, 11 pages.

\* cited by examiner

SECONDARY MARKET AND VENDING SYSTEM FOR DEVICES

CROSS REFERENCE TO RELATED APPLICATION

The present application is a is a continuation of U.S. patent application Ser. No. 17/394,255 filed Aug. 4, 2021, issued as U.S. Pat. No. 11,790,328 on Oct. 17, 2023, which is a continuation of U.S. patent application Ser. No. 15/901, 526, filed Feb. 21, 2018, issued as U.S. Pat. No. 11,107,046 on Aug. 31, 2024, which is a continuation of U.S. patent application Ser. No. 13/862,395, filed Apr. 13, 2013, issued as U.S. Pat. No. 9,904,911 on Feb. 27, 2018, which is a continuation of U.S. patent application Ser. No. 13/562,292, filed Jul. 30, 2012, issued as U.S. Pat. No. 8,423,404 on Apr. 16, 2013, which is a continuation of U.S. patent application Ser. No. 13/017,560, filed Jan. 31, 2011, issued as U.S. Pat. No. 8,239,262 on Aug. 7, 2012, which is a continuation of U.S. patent application Ser. No. 12/727,624, filed Mar. 19, 2010, issued as U.S. Pat. No. 7,881,965 on Feb. 1, 2011, which is a continuation-in-part application of U.S. patent application Ser. No. 12/573,089 filed on Oct. 2, 2009, issued as U.S. Pat. No. 8,195,511 on Jun. 5, 2012, which claims priority to and the benefit of U.S. Provisional Patent Application 61/102,304 filed on Oct. 2, 2008, and U.S. Provisional Patent Application No. 61/183,510 filed on Jun. 2, 2009, each of which is incorporated herein by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to recycling of mobile phones. More specifically, the present invention relates to a kiosk for analyzing mobile phones and providing remuneration to an owner for recycling of the mobile phone.

Description of the Related Art

There has been a large increase in the number of electronic devices used by 0the typical consumer. These devices include cell phones, PDA's, mp3 players, GPS devices, cameras, beepers, remote controls, cordless phones, calculators, etc. The rapid pace at which new technology and models of electronic devices are introduced creates a situation where many consumers upgrade or replace one or more recyclable device on a frequent basis. Often, the consumer does not dispose of the prior electronic device, but rather just stops using it and begins using the new device. This may happen over several generations of such devices.

In addition to the electronic devices mentioned above, there are many other types of devices that have relatively high frequency replacement rates, including portable mobile electronic devices, such as cell phones, MP3 players, etc, and non-portable electronic devices, such as computers, printers, and the like. In addition to electronic devices, there are content based digital media such as games on CD, DVD, or cartridge, or entertainment mass storage items such as CDs, DVDs, BluRay, etc. There is a need for handling of such items in an ecologically friendly manner, both via recycling or by proper disposal procedures. It has not been convenient for owners of electronic devices to either recycle such devices or to properly dispose of such devices. There is currently little incentive for a device owner to "do the right thing" with a used device. When the owner just stops using a device and simply puts it in storage: the opportunity for recycling or re-use by another party is lost. If the owner just throws the device away in normal trash containers, the proper recycling or safe disposing of the device is thwarted.

One particular problem associated with this phenomenon can be illustrated by an example of mobile phones. There are more than 3.6 billion mobile phone users in the world with an annual growth of 10% per annum. The replacement rate of mobile handsets is roughly every 18 months as new models have more features and new standards evolve. Wireless carriers also offer new phones below cost, or free, as incentives to get customers to sign lucrative two-year service contracts ensuring a constant build-up of old mobile phones. Old mobile phones and other mobile devices (pagers, PDAs) present a growing threat to the environment. As of 2007, there are more than 750 million mobile phones waiting to be recycled in the US, either in drawers or already in the waste stream. Another 150+ million or so are added every year. Once in the waste stream, these devices may leak Lead, Mercury, Cadmium, Arsenic and other toxic substances into the water supply. Municipalities often incinerate their waste, instantly putting these toxic elements into the air, and they return to earth in rain water. A problem that needs to be solved is to make it easy and accessible for the public to recycle or resell their mobile phones and other recyclable devices. Two reasons why mobile phones are not being recycled or resold are difficult access to recycling or reselling facilities, and secondly security concerns about the information stored on the mobile phone. In addition to mobile phones, the same problems apply to many other electronic devices.

Technology has not yet provided a resolution to this problem. One invention is Bishop, U.S. Pat. No. 4,951,308 for Automated Vending Of Cellular Hand-Held Telephones And Cellular Telephone Services, which discloses a vending machine that dispenses cellular telephones purchased by consumers through the vending machine. Bishop essentially adds to the problem by making it easier to acquire mobile phones.

Taylor et al., U.S. Patent Publication Number 2009/0190142, for a Method And System For Connecting A Data Storage Device To A Kiosk, discloses a kiosk with a docking port and an optical recognition device for identifying a data port on a data storage device. Taylor is directed at printing digital images at a photo kiosk.

The prior art has failed to recognize the problems associated with recycling mobile phones in a manner that is enticing to a consumer yet financially rewarding to the recycler.

BRIEF SUMMARY OF THE INVENTION

The present invention enables one to securely recycle, donate, trade-in, and/or sell mobile phones in a publicly accessible location. In an embodiment where mobile phones are recycled, the invention is used by a mobile phone owner to submit his/her mobile phone for recycling via a recycling kiosk and receive compensation in some manner. The compensation might be dispersed via cash, voucher, credit or debit card, or other magnetic or electronic transaction methods.

In one embodiment, a method for conducting the collection of previously used mobile phones for the purpose of recycling and refurbishing uses a kiosk in a publicly accessible location. The kiosk displays one or more transaction options. The method further includes interaction between the user and the kiosk display options which may include powering the mobile phone, testing and optical scanning, erasing of the stored data in the mobile phone, determination and acceptance by consumer of compensation for the mobile phone's value. The method may further include selection by consumers through interaction with the kiosk a variety of compensation methods including dispensing of cash, or redeemable voucher via coupon, or credit card debiting or crediting, electronic donation to user specified charity or charities, or other electronic payment methods.

One aspect of the present invention is a kiosk for analysis of a mobile phone and financial remuneration to a user for submission of the mobile phone. The kiosk includes a housing, a user interface, at least one camera, a plurality of electrical connectors, an electrical connector dispensing device and a processor. The housing has an inspection area for placement of a mobile phone therein. The user interface is positioned on an exterior surface of the housing for a user to input information. The at least one camera is focused on a field of view within the inspection area of the housing. The at least one camera is capable of acquiring an image of a portion of a mobile phone placed within the inspection area including at least an image of a display screen of the mobile phone. At least one electrical connector of the plurality of electrical connectors is capable of connecting to the mobile phone placed within the inspection area. The electrical connector dispensing device dispenses one electrical connector of the plurality of electrical connectors to the inspection area. The processor is positioned within the housing and is in communication with the at least one camera, each of the plurality of electrical connectors and the user interface. The processor is configured to identify the brand and model number of the mobile phone based on at least one of the information from the user and the images from the at least one camera. The processor is configured to determine the at least one electrical connector to dispense to the inspection area. The processor is configured to perform a visual analysis of the display of the mobile phone. The processor is configured to perform an electrical analysis of the mobile phone. The processor is configured to determine a financial remuneration value for the mobile phone.

Another aspect of the present invention is a method for analysis of a mobile phone and financial remuneration to a user for submission of the mobile phone. The method includes placing a mobile phone in an inspection area of a recycling kiosk. The method also includes acquiring an image of a portion of the mobile phone placed within the inspection area including at least an image of a display of the mobile phone. The method also includes identifying the model and make of the mobile phone. The method also includes determining an electrical connector that connects with a data port of the mobile phone. The method also includes performing an electrical analysis of the mobile phone using the electrical connector connected to the mobile phone to determine if the mobile phone is capable of activation, if a display of the mobile phone is not defective, and if the mobile phone can operate as intended. The method also includes determining a financial remuneration value for the mobile phone.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The invention provides a path for consumers and others to sell, recycle, or donate their recyclable electronic devices in a one-stop environment. One aspect of the invention is a single kiosk for recycling a mobile phone. Such mobile phones can preferably be portioned into three basic shapes: 1) a flip phone or clam shell type such as the MOTOROLA RAZR; 2) a slider phone which exposes a keyboard or screen such as the MOTOROLA DROID; and 3) a bar shape phone such as the Apple IPHONE or the Research in Motion BLACKBERRY. Another aspect of the invention is a system preferably including a network of kiosks in public spaces that perform a combination of recycling processing steps that receive, identify, visually inspect, electrically test, electrically erase, grade quality, containerize (bag), label, and inventory recyclable electronic devices. Each kiosk determines some form of compensation to an owner of the device. This compensation is preferably in the form of a direct payment, a credit on an account, a donation to a charity, a discount coupon for future purchases, or some similar form of compensation. The device owner has the choice to accept the offered compensation or reverse the transaction and retrieve the device.

In the following description, an example is given with respect to mobile phones. However, those skilled in the pertinent art will recognize that the system can be implemented with any number of other devices or items, including other recyclable devices, without departing from the spirit and scope of the system. The system applies to, among others, any pre-owned electronic device or other consumer electronic and electric devices.

Figure 1:
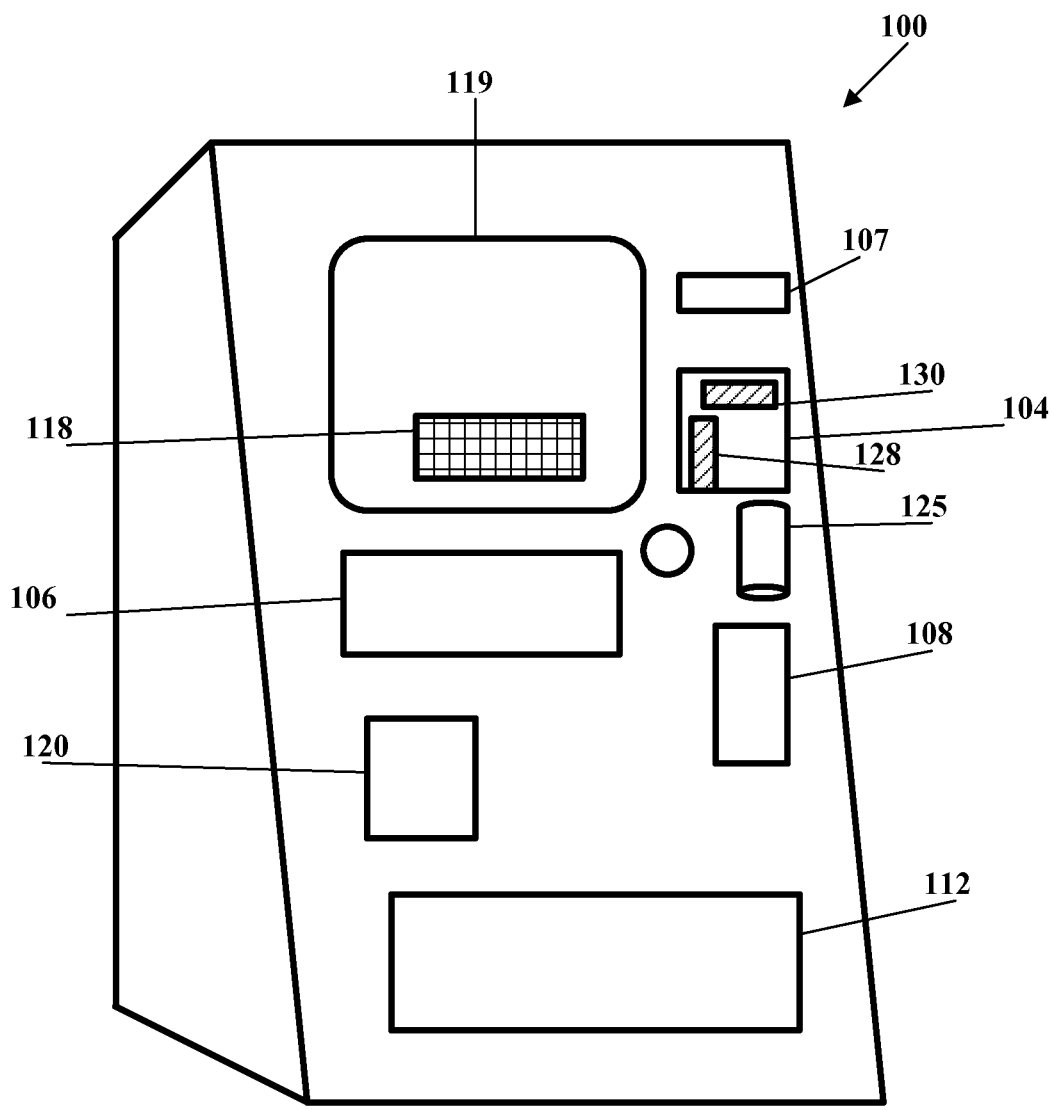
FIG. 1 is a perspective diagram of an embodiment of a recycling kiosk.

FIG. 1 illustrates a partially schematic front isometric view of a recycling kiosk 100 for analyzing a mobile phone and financial remuneration to a user for submission of the mobile phone. The kiosk 100 is of a typical size and shape of a vending machine, such as a soda machine, coin changing machine, can recycling machine, or other vending machines.

The kiosk 100 has a housing 105 to protect the internal components of the kiosk 100 and to secure mobile phones submitted for recycling. The housing 105 is preferably constructed of a metal material, such as steel or aluminum, to prevent authorized access to the kiosk 100.

The recycling kiosk 100 preferably includes a sealable mobile phone inspection area 106, bill and voucher acceptor/dispenser 107, card reader and receipt dispenser 104, mobile phone collector for mobile phones to be refurbished 112, mobile phone collection receptacle 108 (quick drop) for mobile phones to be recycled and computing and communications facility (not shown).

The inspection area 106 is preferably designed to permit a detailed visual inspection of a mobile phone and a detailed electrical inspection of a mobile phone. The size of the inspection area 106 is preferably 30 centimeters ("cm") in length, by 30 cm in width and 20 cm in height. However, those skilled in the pertinent art will recognize that the dimensions of the inspection area 106 can vary without departing from the scope and spirit of the present invention.

The couplings from the kiosk 100 and to a remote computer are preferably a single coupling to a communications network such as the internet via wired LAN, wireless LAN, cellular or any other proprietary communications system. The Kiosk 100 preferably includes a processor 160 for processing the information obtained from the mobile phone and for controlling the components of the kiosk 100. Preferably, the processor 160 is a standard personal computer ("PC") or other type of embedded computer running any operating system such as Linux or MAC OS. The processor 160 is most preferably a small form factor PC with integrated hard disk drive ("HDD"), central processing unit ("CPU") and universal serial bus ("USB") ports to communicate with the other components of the kiosk 100. One most preferred CPU is a DELL PC OPTIPLEX 780. Alternatively, the processing means is a microprocessor with a standalone motherboard which interfaces to a discrete HDD, power supply and the other components of the kiosk 100. The kiosk 100 preferably includes a memory 161 or other storage device, such as a disk drive, that stores the executable applications, test software, databases and other software required to operate the recycling kiosk 100.

The external communication component for the kiosk 100 preferably includes a wired Ethernet to provide connection to the internet, or alternatively the external communication component includes a wireless modem such as GSM, CDMA, 3G and 4G technologies for data communications.

Figure 6:
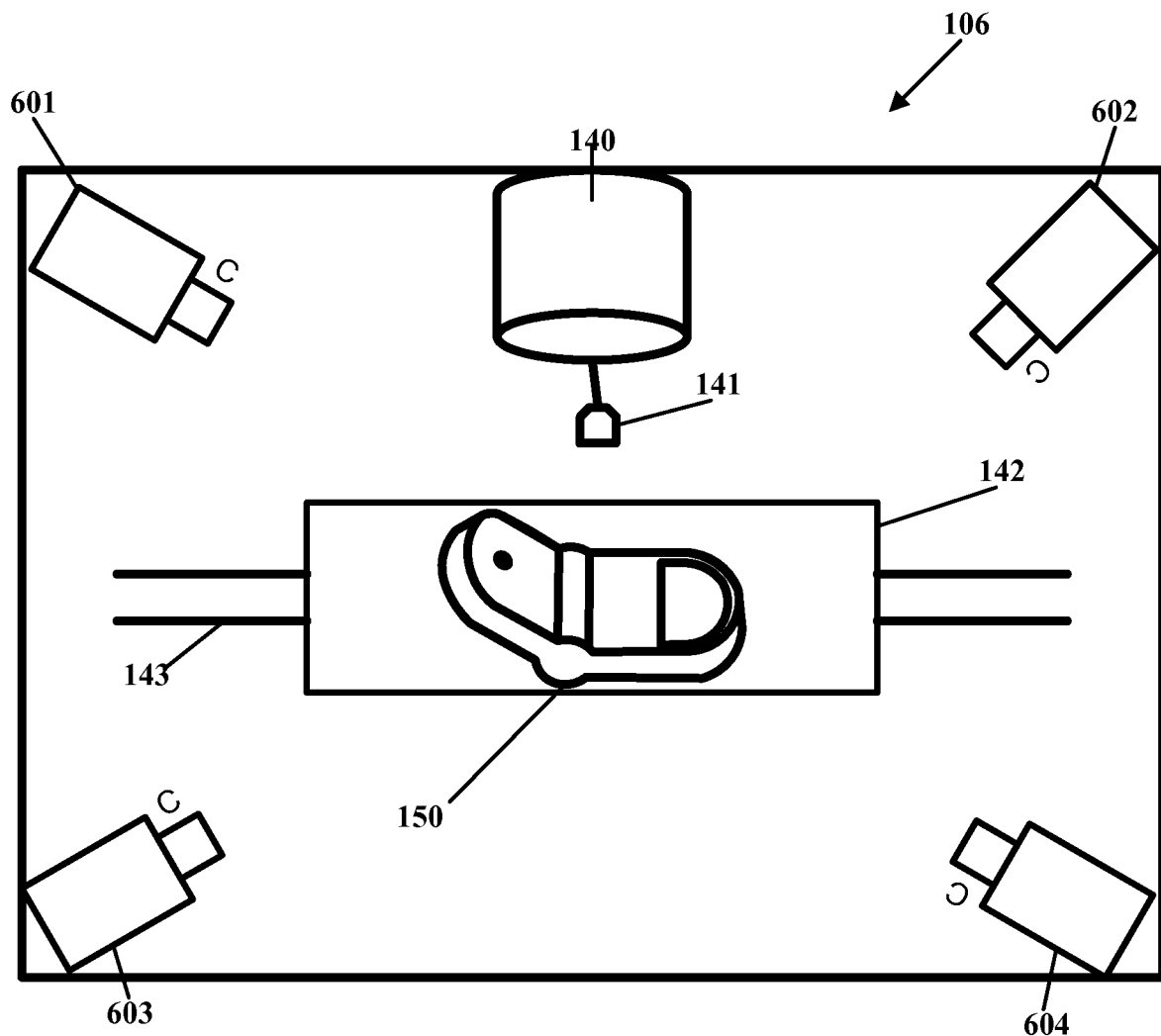
FIG. 6 illustrates an embodiment of the inspection area of a recycling kiosk.

The kiosk 100 preferably also includes a bar code reader 125, bag/package dispenser 120, fingerprint reader 128, and digital signature pad 130. Referring to FIG. 6, the inspection area 106 preferably includes one or more cameras 601-604, and optionally includes magnification tools (i.e. magnifying glass), bar code scanners, weight scales, heat detectors, UV reader/detector, and the like.

Figure 8:
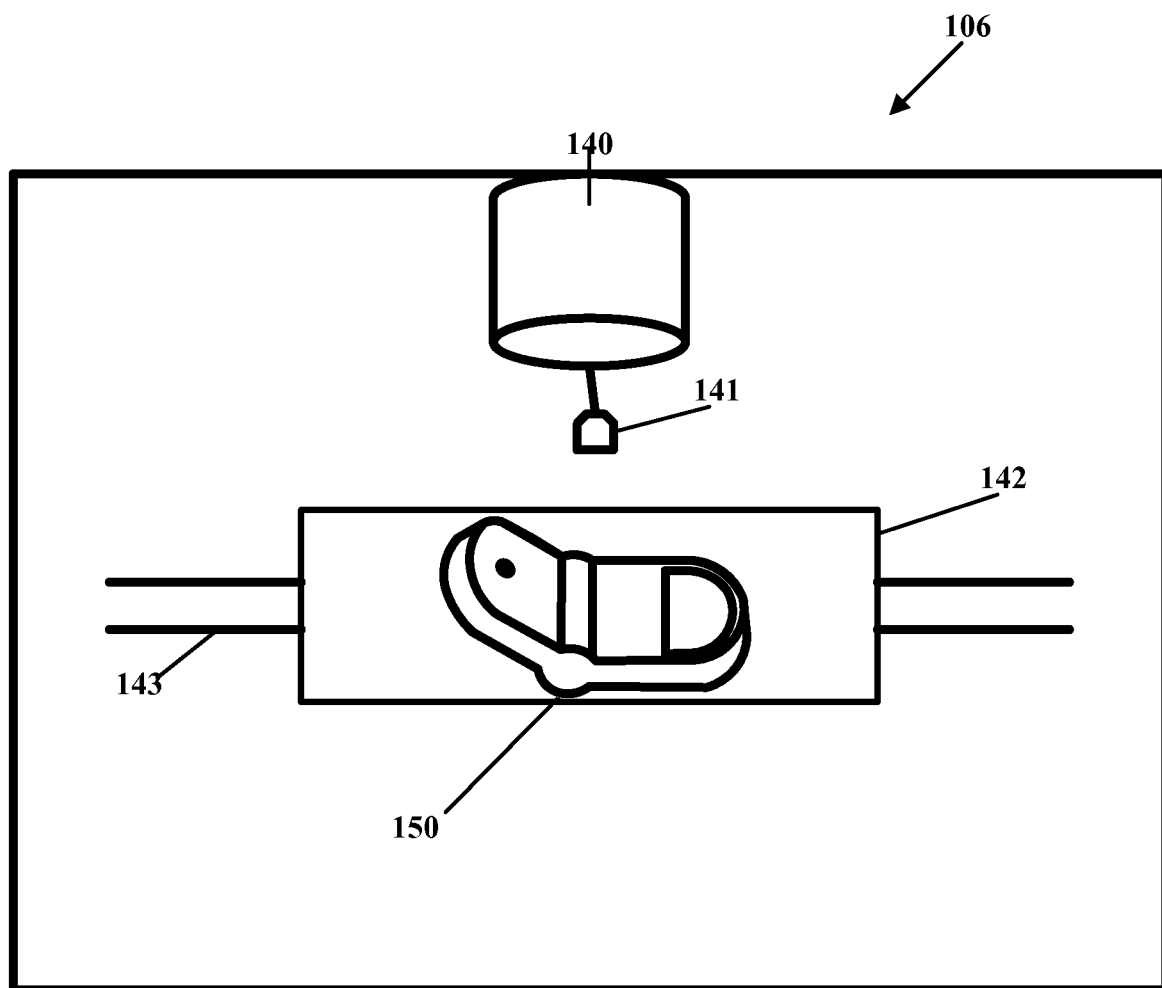
FIG. 8 is an isolated view of an inspection area of a recycling kiosk.

As shown in FIG. 8, a mobile phone 150 is placed within a fixture assembly 142 that is preferably movable on tracks 143 within the inspection area 106. Also shown is an electrical connector dispenser 140 with an electrical connector 141 for insertion into a data port of the mobile phone 150 to conduct an electrical analysis of the mobile phone. The tracks 143 allow for a data port 151 of the mobile phone to be positioned for connection to the electrical connector 141.

Figure 6A:
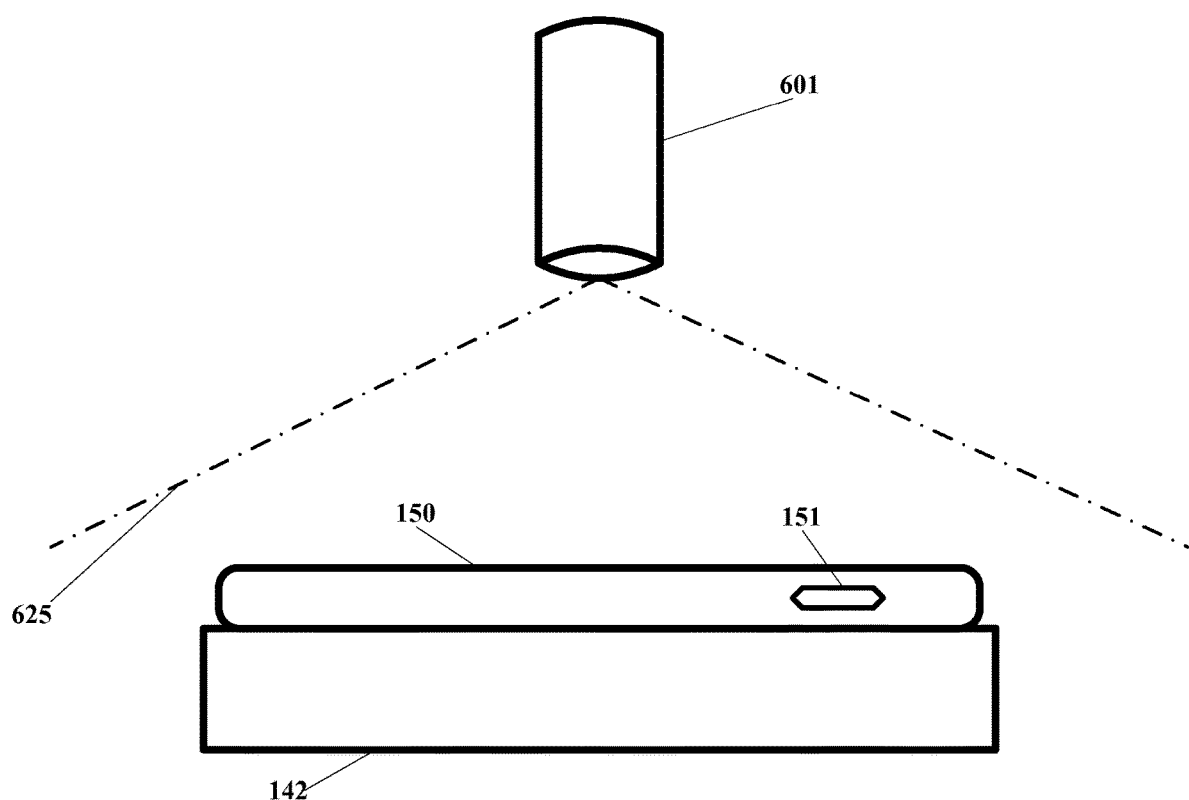
FIG. 6A is an isolated view of an inspection area of a recycling kiosk with a mobile phone positioned within a field of view of a camera for visual inspection.

The visual inspection of a mobile phone 150 in the inspection area 106 is preferably performed by at least one camera 601. Alternatively, the visual inspection is performed by multiple cameras 601-604 as shown in FIG. 6. A preferred camera 601 is a 1 megapixel machine vision camera. If a single camera 601, as shown in FIG. 6A, is utilized in the inspection area 106, the camera 601 preferably is movable to increase a field of view 625 of the inspection area 106 to inspect the mobile phone fixed in the fixture assembly 142. The camera 161 is preferably movable along an arc-like track along a ceiling of the inspection area 106. Preferably the camera 601 is movable to inspect a data port 151 of the mobile phone 150 to determine the type of electrical connector 141 for the mobile phone 150. Alternatively, mirrors are positioned in the inspection area 106 to permit a greater visual inspection of a mobile phone 150 as the mobile phone 150 is fixed in the fixture assembly 142.

The fixture assembly 142 optionally operates as a weight scale to obtain a mass of the mobile phone 150 for use in determining a remuneration value for the mobile phone 150. For example, if the mass of the mobile phone 150 is less than set forth in a vendor specification for the mobile phone 150, then one or more components of the mobile phone 150 may be missing, such as the battery for the mobile phone 150.

Preferably, visual inspection and recognition software is utilized by the kiosk 100 to analyze a mobile phone 150. In one preferred method, a recognition algorithm is applied to a specific make and model of a mobile phone 150. The visual inspection and recognition software determines the borders of a mobile phone 150 under inspection to determine the external dimensions of the mobile phone 150. The external dimensions are utilized to determine a subset of possible mobile phones from a master database of mobile phones stored in the memory 161 of the kiosk 100 or available online to the kiosk 100 using external communications. The visual inspection and recognition software then preferably uses a set of secondary and tertiary features to further distinguish the mobile phone 150. These secondary and tertiary features can include placement and size of the display screen, placements and size of the keyboard, unique buttons, placement of ports, and other distinguishing features. Once an exact make and model of the mobile phone is determined, the visual inspection and recognition software subtracts an image of the mobile phone 150 from an image of a perfect mobile phone for the same make and model. The result of the subtraction is preferably a quantifiable number of pixels that are calibrated into categories of broken or missing parts, cracked screen, and low, medium or high wear.

Alternatively, the visual inspection is performed using neural network pattern recognition techniques to identify the mobile phone 150, then filter algorithms are utilized to determine defects such as cracked screens. Further, those skilled in the pertinent art will recognize that other visual inspection techniques may be employed without departing from the scope and spirit of the present invention.

Further, visual inspection optionally includes obtaining a heat signature for the mobile phone 150. One preferred method of obtaining a heat signature of a mobile phone 150 is to raster a laser across the mobile phone to characterize a heat decay profile of the submitted mobile phone 150. This heat decay profile is then compared to a heat decay profile for a perfect sample of the same mobile phone 150. The heat decay profile indicates the wear of the external surface of the mobile phone 150, which is used in calculating the financial remuneration for the mobile phone 150.

Figure 8A:
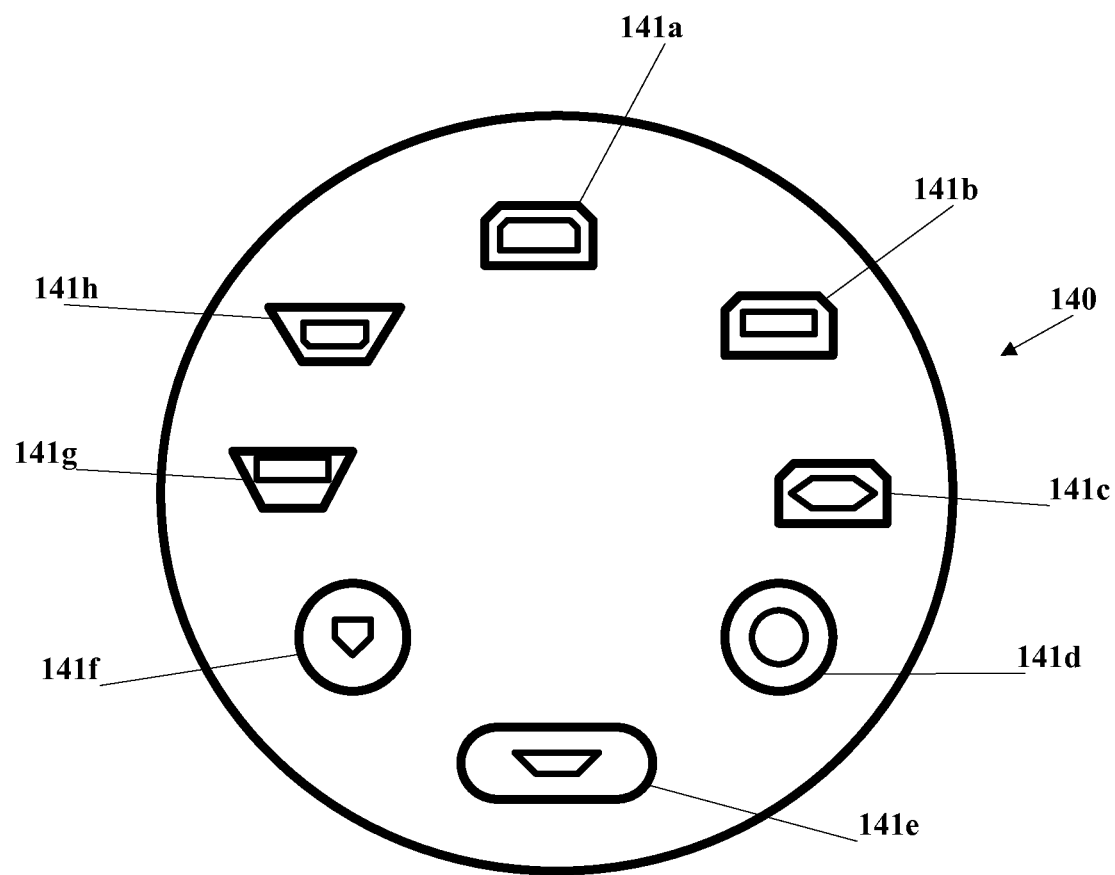
FIG. 8A is an isolated view of an electrical connector dispenser with multiple electrical connectors.
Figure 8B:
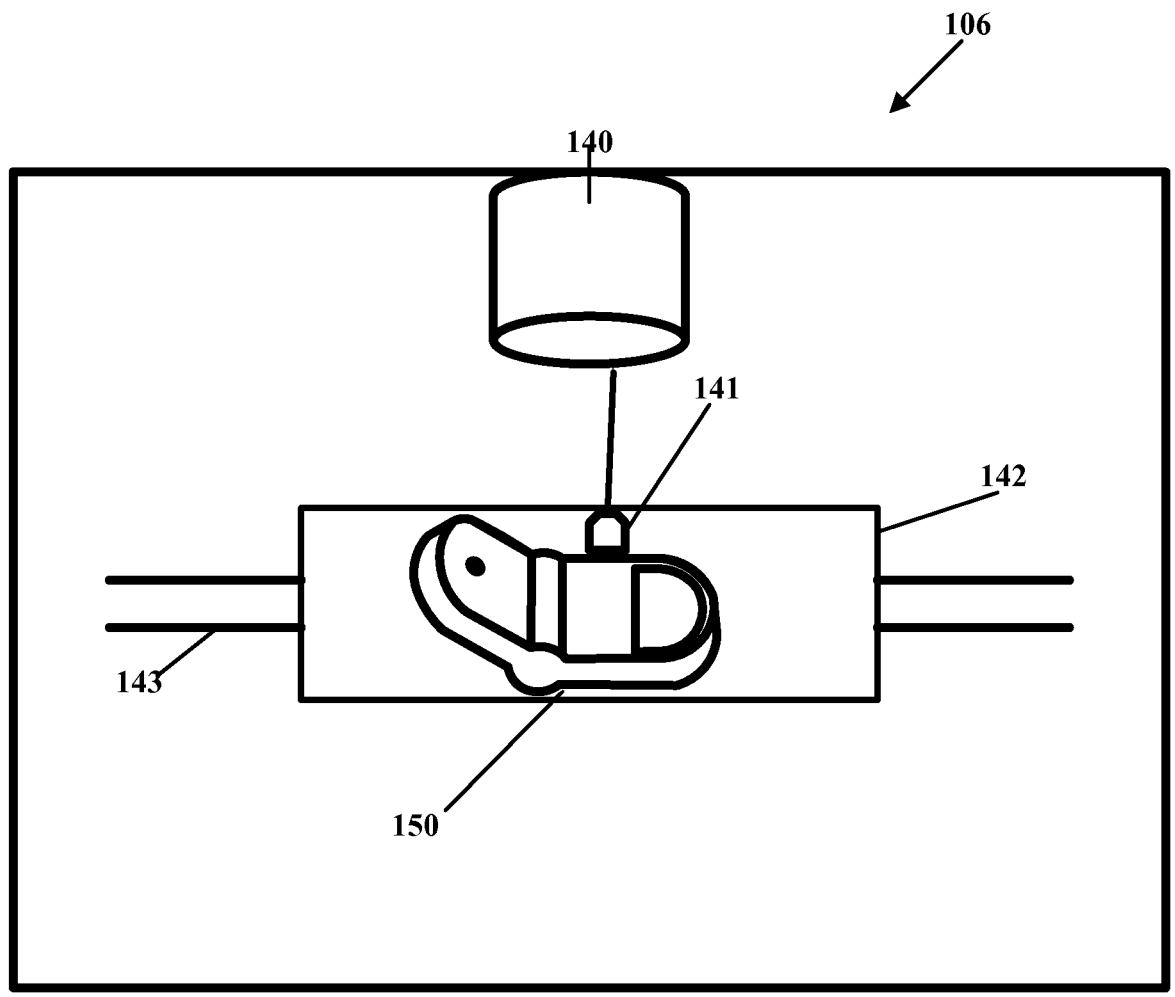
FIG. 8B is an isolated view of an inspection area of a recycling kiosk with a mobile phone connected to an electrical connector.

The electrical analysis of a mobile phone 150 is preferably performed using an electrical connector 141 connected to a data port of a mobile phone 150. Typically, a single port is used to charge a mobile phone 150 and transfer data to and from a mobile phone 150. As shown in FIG. 8A, the kiosk 100 preferably has an electrical connector dispenser 140 that includes a plurality of electrical connectors 141*a*-141*h* since there currently is no single universal electrical connector for all mobile phones. Once the make and model of the mobile phone 150 is determined, either by visual inspection or user input using a user interface 118 as discussed below, the correct electrical connector 141 is dispensed by the electrical connector dispenser 140 for connection to the data port of the mobile phone 150. The connection of the electrical connector 141 to the mobile phone 150 is preferably performed automatically by the kiosk 100. Alternatively, the proper choice of electrical connector 141 is illuminated or in some other way presented to the consumer for manual connection of the electrical connector 141 to the data port of the mobile phone 150. An electrical connector 141 connected to a data port 151 of a mobile phone 150 is shown in FIG. 8B. Electrical analysis software is preferably utilized by the kiosk 100 to interact with the mobile phone 150. The electrical analysis preferably determines if the mobile phone is capable of activation, maintaining a charge, performing correctly, powering a display screen of the mobile phone 150, providing make, model, serial number and other pertinent information about the mobile phone 150, and other relevant information.

One method for determining a value of a mobile phone is an eight grade scale based on power up of the mobile phone 150, the liquid crystal display ("LCD") and the mechanical condition of the mobile phone 150. The grading is based on a yes/no response for the mobile phone 150. Table One is an example of such a grading table.

TABLE ONE

| GRADE | POWER UP | LCD | MECHANICAL |
|---|---|---|---|
| A | Y | Y | Y |
| B | N | Y | Y |
| C | Y | N | Y |
| D | N | N | Y |
| E | Y | Y | N |
| F | N | Y | N |
| G | Y | N | N |
| H | N | N | N |

The recycling kiosk 100 preferably further includes a user interface device, such as a touch screen display 118 projected on a display screen 119 of the kiosk 100. The touch screen display 118 preferably includes a keypad, user selection buttons 115A-115D, soft keys, and other similar components. The touch screen display 118 is used to enable quick and easy access to various features and functions of the recycling kiosk 100. The display screen 119 displays information in color, monochrome, or "gray-scale." and is used to display elements of a user interface, advertisements, or other information. The recycling kiosk 100 preferably dispenses various forms of payment, including cash, credit cards, debit cards, chip cards, gift cards from the kiosk's host location or other gift cards, and other magnetic striped cards or electronic payment methods. In one embodiment of a user interface device of the recycling kiosk 100, a telephone handset is included (not shown) to enable a customer to communicate with advertisers, providers of products advertised on the recycling kiosk, and to access assistance in using the recycling kiosk 100. In other embodiments, a microphone/speaker arrangement is used for a similar purpose. The recycling kiosk 100 also includes a digital camera to record the image of the user for purposes of complying with the Second Hand Dealer Laws of various States. The kiosk 100 also preferably includes a supply of sealable plastic bags in a bag dispenser area 120 that have pre-printed barcode labels affixed thereto. The kiosk 100 also includes a bar code reader 125 to scan the bar code and associate it with a phone that is being transacted at the kiosk 100. The bar code reader and/or ultraviolet ("UV") detector is used to scan an identifying bar code or other form of encoded information to identify the product model or product number. The kiosk 100 also uses the barcode reader to read the barcode identification on the inside of the battery pack. The UV detector is used for reading "invisible" barcodes in use by certain vendors such as Apple and others. The bar code reader, camera, and/or UV detector of the kiosk 100 is another technique used to identify the product model, IMEI #, and/or FCC ID. Alternatively, the kiosk 100 communicates with the mobile phone 150 using BLUETOOTH or WiFi communications to test and if necessary erase data from the mobile phone 150.

Figure 7:
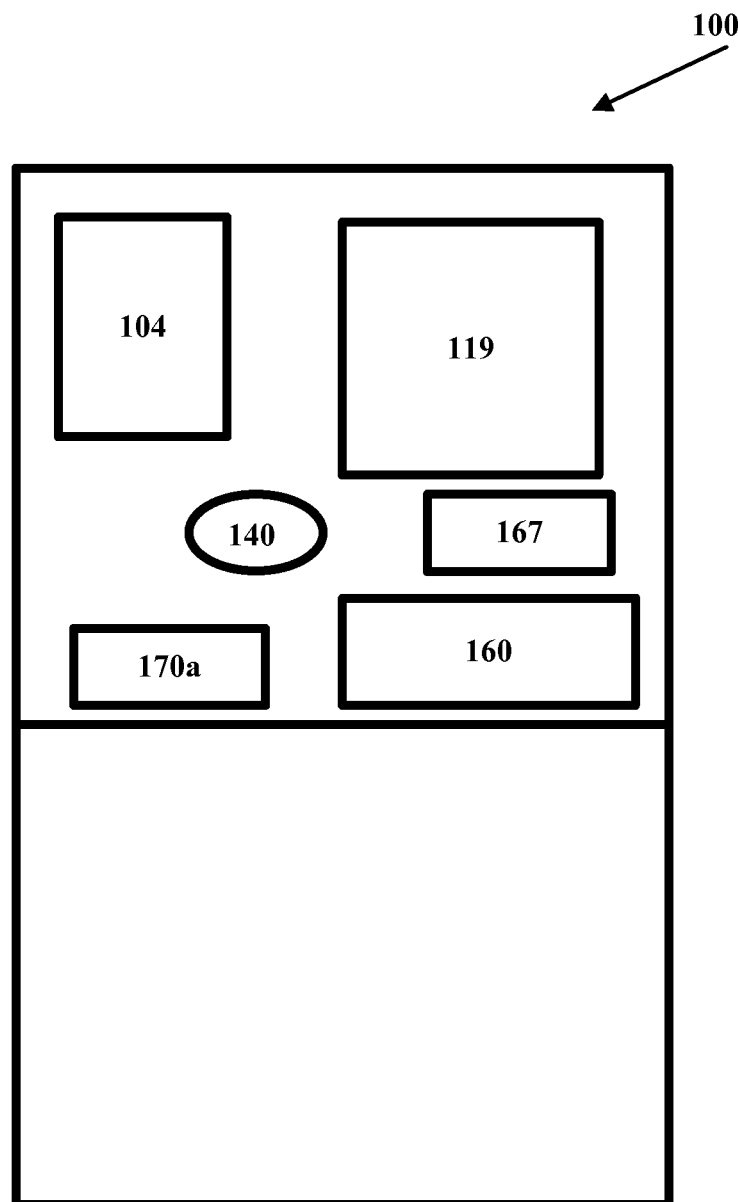
FIG. 7 illustrates an internal back of a recycling kiosk.
Figure 9:
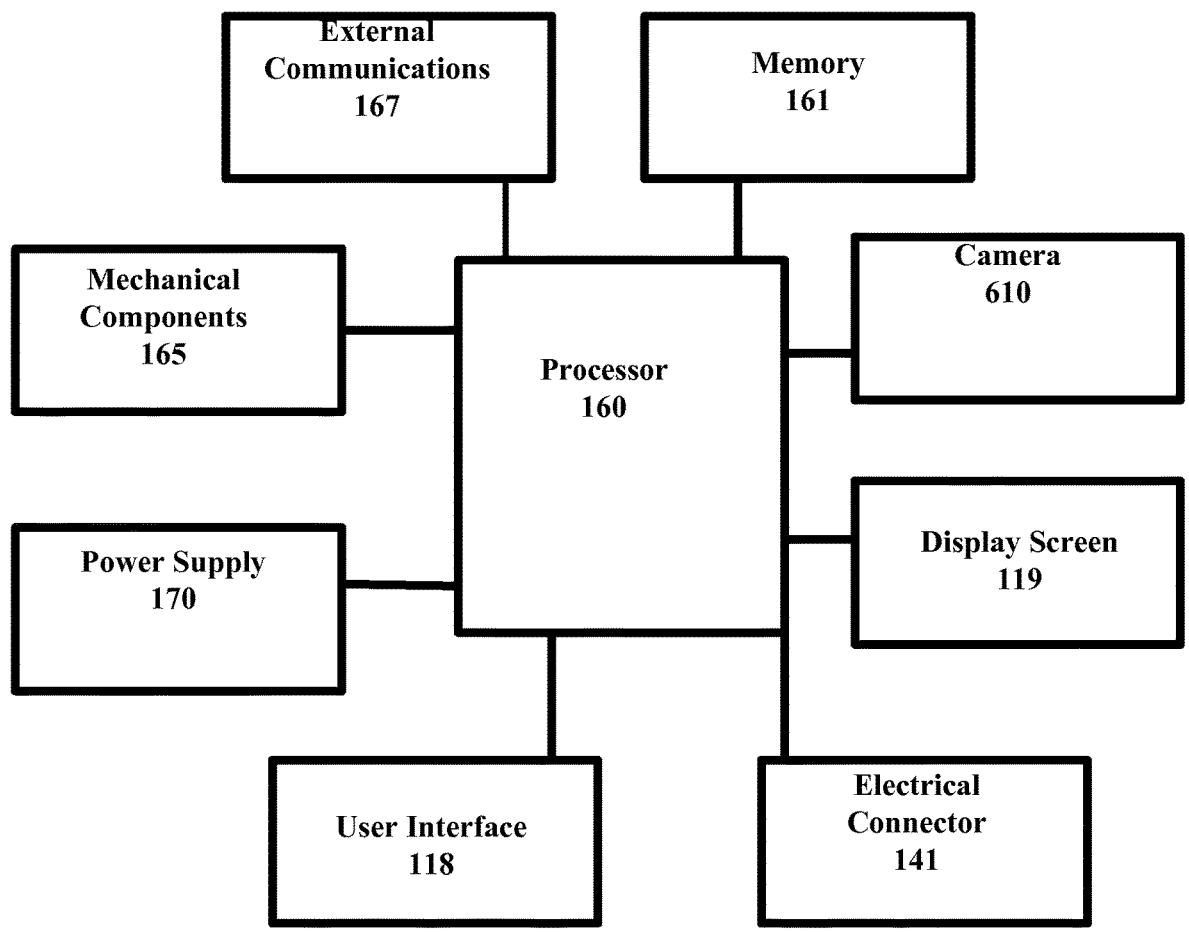
FIG. 9 is a block diagram of the components of a recycling kiosk.

FIG. 9 is a block diagram of the main components of the kiosk 100. A processor 160 is preferably in communication with the other components of the kiosk 100. The memory 161 preferably contains a database of information on multiple mobile phones including images, physical characteristics, prices and other similar information. The external communications 167 preferably communicates through a wireless connection or Ethernet with a network to receive and transmit information to a remote site. The power supply 170 is preferably received through a plug-in connection to a wall outlet. The mechanical components 165 include the electrical connector dispenser 140, the bag/package dispenser 120, the fixture assembly 142, and other similar components. The camera 161 or cameras, electrical connectors 141 and user interface 118 interact with the processor 160 as discussed above. FIG. 7 illustrates an internal back of a recycling kiosk 100. As shown a processor 160 is preferably a personal computer having a battery backup 170*a*, a wireless connection 167 for external communications, an electrical connector 140, receipt dispenser 104 and a display screen 119.

The processor 160 identifies the mobile phone 150 submitted for recycling using information from the visual inspection and user interface. The processor 160 also determines the proper electrical connector 141 for connection to the data port 151 of the mobile phone 150 using information obtained during the visual inspection or from the user interface. The processor 160 also directs and receives information from the electrical analysis of the mobile phone 150 performed using the electrical connector 141 connected to the data port 151 of the mobile phone 150. The processor also determines a financial remuneration for the submitted mobile phone 150 based on the visual inspection, the electrical analysis and data stored in the memory 161 of the kiosk or information provided externally through the external communication component 167.

In one use of the kiosk 100, a consumer is asked to pre-bag, pre-box or place a barcode label on the consumer electronic ("CE") device at some point before or during the inspection process. The consumer is instructed to use wheels, slides or levers to drop the mobile phone into a bag, box or directly into a bin. If dropped into a bag or box, the consumer is instructed to use wheels, slides or levers to seal the outer package.

Each kiosk 100 preferably bins mobile phones according to parameters including but not limited to: vendor/model, condition, value, visual quality, physical damage, water damage, locked or unlocked, carrier compatibility, frequency of phone, type of cellular standard supported (CDMA, GSM, etc.), or combinations of these parameters. The inventory of each kiosk 100 is then preferably automatically transmitted from the kiosk 100 to an online web posting whereby auctions, or live auctions are held allowing buyers to bid and purchase specific bins from specific kiosks in real time. The bins are shipped directly from each specific kiosk 100 to the bid winner during the next time the kiosk 100 is serviced. Bins are preferably associated with a single model or group of models. In other cases the bins are associated with a particular type of phone (e.g. CDMA), or another specific-type grouping. Bins are also associated with devices that are to be recycled for their material value, and should only ship when the bin is full. While other devices are binned to distinguish that they need to ship as quickly as possible because the device has immediate aftermarket re-sale demand and the real-time connection to the kiosk 100 enables real-time inventory tracking and binning of recycled devices In one embodiment, the display of the kiosk 100 displays current purchase prices for different models of mobile phones. This current pricing is used to encourage and provide incentive to customers to bring their used phones to the kiosk 100 for resale or recycling. The kiosk 100 is in regular and periodic communication with a server to receive such data and update its display accordingly. The pricing data provided to the kiosk is called the Offer Price to the consumer, and is preferably based upon aftermarket sales prices which vary on a regular basis (e.g., daily) for each make/model of recycled device. The offer price presented to the consumer is preferably determined by subtracting the recycling fee from the pricing data provided by the aftermarket reseller.

The kiosk 100 also preferably monitors all of its consumables (paper, ink, etc.) and requests new supplies automatically so that the kiosk 100 is substantially constantly operational. The kiosk 100 also preferably monitors the inventory of items collected by the kiosk and provides a shipment report to the reverse logistics vendors to determine the number, size, and weight of items to be collected from the kiosk 100.

Figure 2:
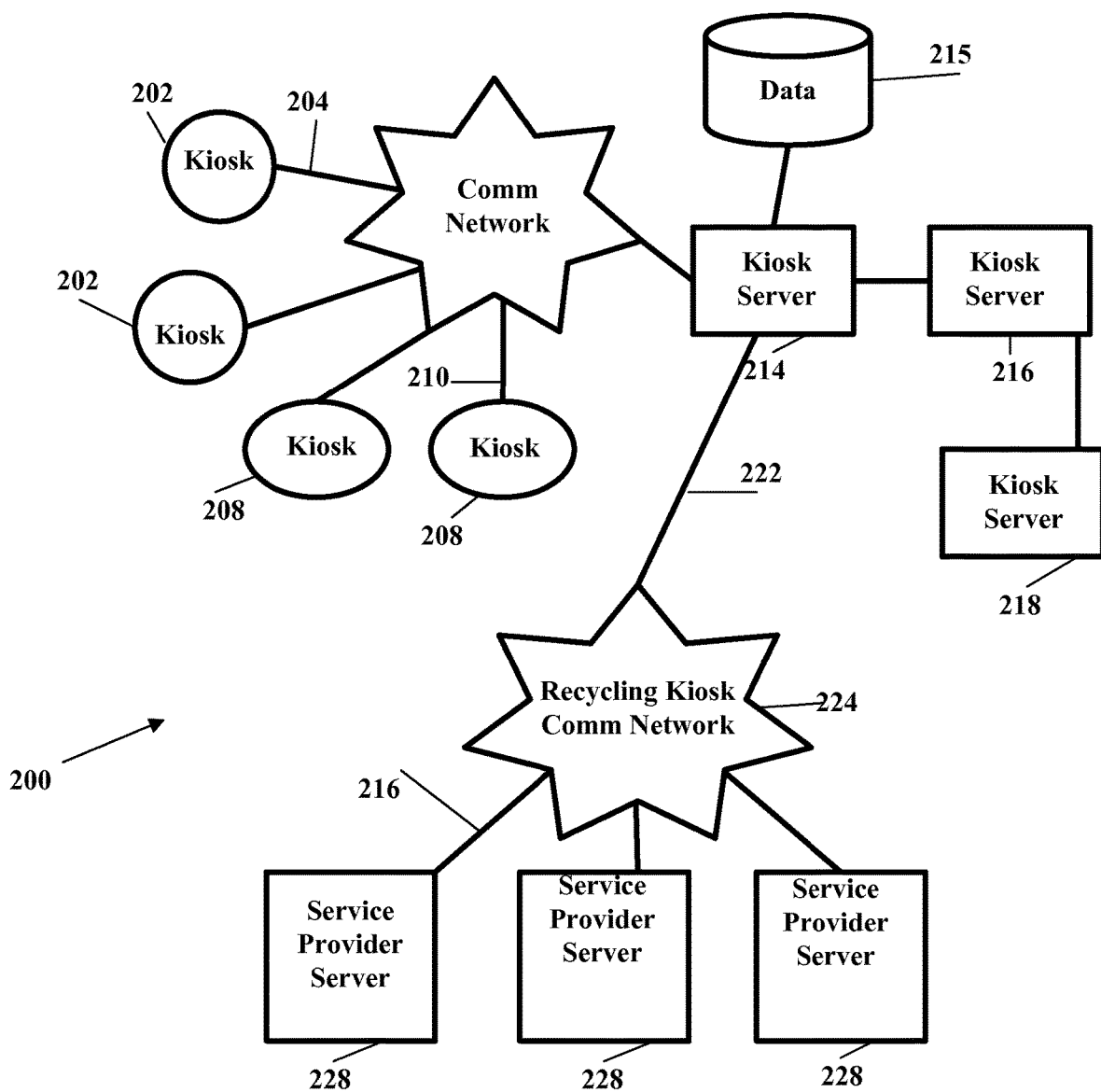
FIG. 2 is a diagram illustrating a system of a network of recycling kiosks.

FIG. 2 illustrates a network topology 200 configured in accordance with an embodiment of a system. In one aspect of this embodiment, several recycling kiosks 202 are coupled via communications links 204 or 210 to a communications network 206. While two forms of connecting recycling kiosks are shown in FIG. 2, several embodiments are anticipated. Examples of embodiments of recycling kiosks include various forms of vending machines, Open Mobile Service Interface based kiosks, and other retail automated machines. Also coupled to the communications network 206 via a communications link 212 is a recycling kiosk server 214.

Transactions selected by customers at the recycling kiosks 202 or 208 are routed to the recycling kiosk server 214. In another aspect of this embodiment, the recycling kiosk server 214 is coupled to a database 215. The database 215 is preferably stored on the same or another recycling kiosk server 214, or resides in a separate server (not shown). One familiar with the relevant art will understand how software executing on a recycling kiosk server 214 is able to retrieve data stored in the database 215, whether that database 215 is stored on the same or separate servers. The database 215 preferably stores information including unique identifiers that have been provided to customer via the Touch Screen user interface or by way of wired or wireless communications to mobile device relating to vouchers, a personal identification number associated with each unique identifier, a telephone number, a credit amount, an indication of whether the voucher identified has already been used, and other pertinent information relating to providing recycling services on any recycling kiosk 202 or 208. In one aspect of this embodiment, the database transfers media content or executable applications to be delivered to the users' mobile device by way of wired or wireless communications.

In yet another aspect of this embodiment, the recycling kiosk server 214 is coupled via a communications link to a biometrics server 216 and a content server 218. The biometrics server 216 conducts various fraud detection and prevention activities, including prevention of fraudulent credit cards. The content server 218 performs various activities, including storing user interface content and advertising for use on the recycling kiosks 202 and 208. One familiar with the relevant art will understand how content stored on the content server 218 is transferred via various communications links and protocols to recycling kiosks 202 and 208 for rendering the content.

The content stored on a content server 218 preferably includes images, Extensible Markup Language ("XML") documents, hypertext markup language ("HTML") documents, audio, video, text, etc., and instructions to enable a recycling kiosk 202 or 208 to render the content correctly. As an example, advertising and other content specifically targeted to consumer demographics on a kiosk or time-of-day basis is rendered on recycling kiosks 202 and 208 after retrieval from the content server 218. A recycling kiosk 202 located in a department store displays different advertisements than a recycling kiosk 208 located at a convenience store. Additionally, a recycling kiosk 202 located in a department store shows different advertisements during weekdays than during evenings and weekends to target different demographics. Further, a recycling kiosk 202 located in a sporting goods department shows different advertisements than a recycling kiosk 202 located in an electronics department.

Recycling kiosks 202 are preferably located in many public or otherwise accessible locations including shopping centers, street sidewalks, gas stations, DVD rental stores, grocery stores, and restaurants in addition to department and convenience stores. The recycling kiosk server 214 is also coupled via a communications link 222 to a recycling kiosk communications network 224. Multiple service provider systems 228 are also coupled to the recycling kiosk communications network 224 via communications links 226. Examples of service provider systems 228 include systems operated by eBay, cellular telephone companies, bankcard companies, and aggregators of services from service providers. These various service provider systems 228 operate independently on different computer systems and may use different communications protocols. The recycling kiosk server 214 is able to exchange information with multiple service provider systems 228 independently or jointly and in parallel or sequentially despite using the same or different communications protocols or system software.

Figure 3:
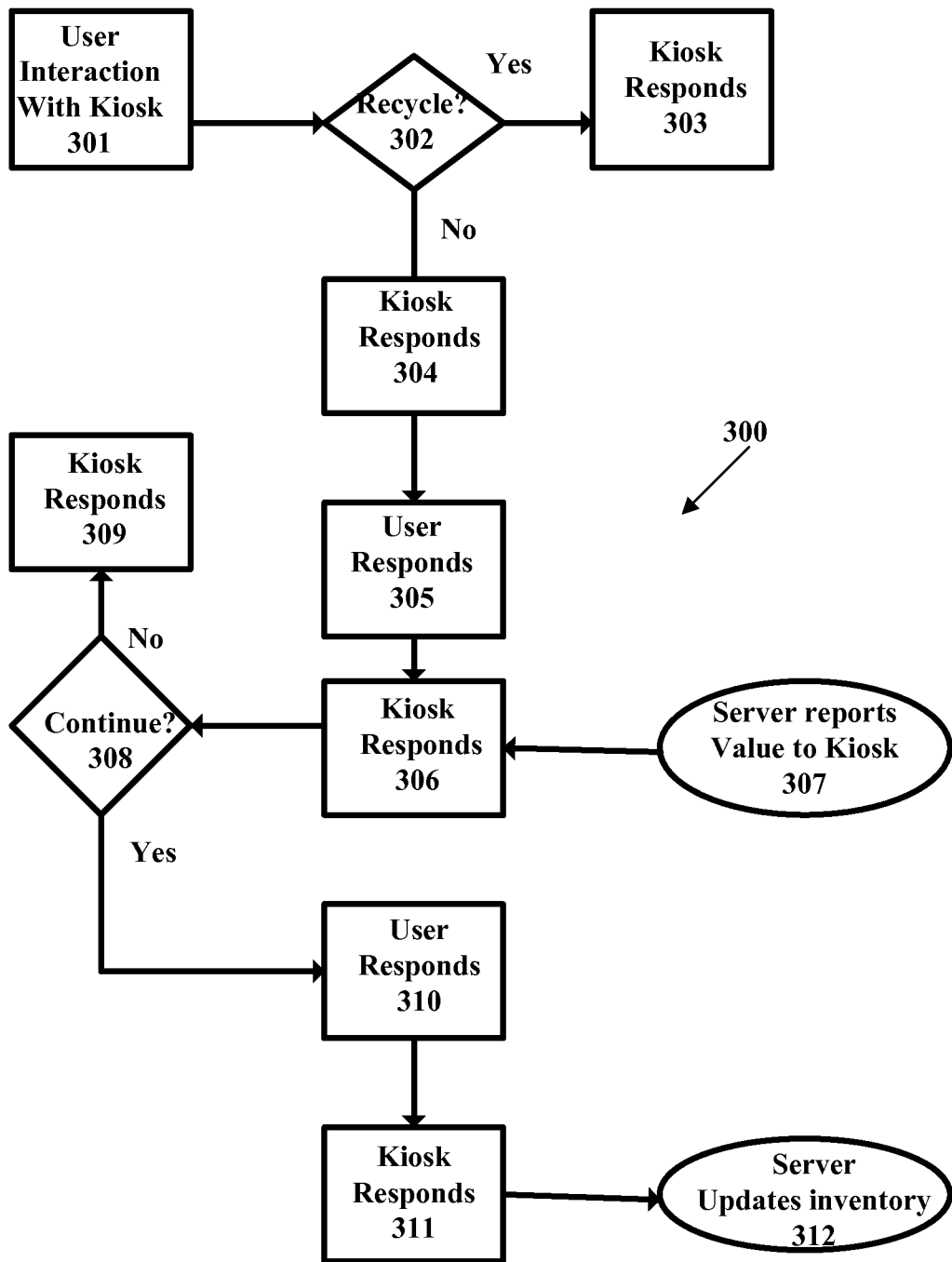
FIG. 3 is a flow diagram of an operation of recycling a mobile phone using a recycling kiosk.

A possible use scenario of the embodiment described in FIG. 1 and FIG. 2 is shown in FIG. 3. At step 301 a customer elects to sell or recycle a mobile phone. The customer checks to see if his mobile phone is supported for sale/refurbishing from a list on the screen of the kiosk. The customer activates the on-screen menu system and either enters the phone model directly or goes through a series of menus to determine if the phone is eligible for sale or only for recycling. After identifying the model phone, the customer may optionally at step 301 select a charity to which to donate proceeds and/or identify a fund raising group so that appropriate credit can be given to that group. In other embodiments, the steps can be done at a later time. In one embodiment, the kiosk 100 takes a picture of the customer and associates it with the phone and the transaction, to prevent fraud claims or to identify potential customers who are selling stolen phones.

At decision block 302 it is determined if the phone is only available for recycling. If yes, (i.e. it is not on the list of phones available for reselling) the customer can insert the mobile phone into receptacle 106 at step 303 and the phone falls into bin 112 for recycling. A tax voucher might be presented through 107 for the recycled phone.

If the phone is supported for refurbishment/resale the customer is then encouraged to engage the testing/rating operation of the system. At step 304, the system has determined the correct connector to couple to the phone. Connectivity options and are not limited to cable, standard or proprietary connectors, hard docks, reading removable or external physical memory or other wireless methods like WiFi, Bluetooth, RFID, NFC, and the like. In one embodiment, the system includes a plurality of connectors for known phone models. Based on the input from the user as to the identity of the phone model, the system can select the correct connector and offer it to the customer. In other embodiments, a plurality of connectors is available and identified (by name, color, etc) and the user is informed as to which one to use. In another embodiment, a universal connector is used to connect to the phone. After the phone is connected, the system presents a cage or cradle in which to place the phone. This is designed so that the phone is in a known or unknown initial position so that it can be visually inspected using photographic or other equipment.

At step 305 the phone is connected and inserted into inspection area 106. If this has been done correctly, the customer is given some indication (e.g. a green light) and the system proceeds to step 306. For instance, the software may direct the consumer to place the device in the "inspection bin" in a certain orientation. The consumer is then asked to manually change the orientation. Alternatively, the user is asked to turn wheels or use slides or levers to change the orientation. The consumer may be asked to open a device such as a clam shell phone, open doors or view finders on video cameras, pop open features such as flashes, slide open covers, etc. and then place the item back in the inspection area. The user may also be asked to attach cables. The user may also be asked to attach restraints and/or use wheels, slides and/or levers to invoke restraint on the device.

At step 306 the phone is tested for operation using diagnostics and operating via, for example, the OMSI interface. The diagnostics preferably includes electrical and physical testing including testing the phone's battery, screen, memory, button functionality and structural integrity.

In one embodiment, the phone is photographed and analysis software is used to identify scratches, cracks, wear patterns, dents, broken or missing pieces, inclusion of features such as lenses, buttons, connectors, badges, labeling and/or branding. Identification may be done by image comparison or other similar methods where the photograph taken of the phone is normalized and compared to a reference image. Other inspection methods may be used in conjunction with visual and/or electrical testing including weighing each device in the kiosk to determine specific weight and use that data to further refine verification of manufacturer and verification of exact device model. In another embodiment, the photographic image is used to identify the correct manufacturer and model number/product number. Visual identification could include any combination of the following: calculations based upon measurement, physical (e.g., mm, inches), pixel count or other. Identification based upon phone dimensions, location/size of buttons, LCD and other physical characteristics. One camera or multiple cameras may be used to determine height, width, depth as needed. Identification based on OCR (Optical Character Recognition) of identifiers such as Carrier (for phone), brand, model, serial number, other identifiers. Identification based upon barcodes. Consumer may be asked to orient CE on its front, back, side and then asked to change orientation as needed. Consumer may even be asked to remove CE cover(s), batteries and the like in order to gain access to identifiable items, such alphanumeric or barcode data. The kiosk 100 provides a way to use visual inspection with electrical inspection to identify a device, determine its value, and reduce possible fraud. The kiosk 100 determines a preliminary identification of the phone with the visual system, and then present or light up the correct cable for that phone so the consumer can plug in the correct cable. The kiosk 100 then confirms by electrical test that the visual identification was indeed correct, then tests the phone to determine its functionality and value.

Identification is made by comparing collected information and comparing that to a database. The correct model identity is used by the kiosk 100 to determine the correct electrical connector from a database of device specification information for the purpose of performing electrical test, erase or re-programming of the device. For consumer electronic devices such as stereos, computers, DVD players, game consoles, etc., that can be evaluated electronically, in addition to or instead of visually identifying the device; it may be necessary to identify the cable connector type for electronic inspection. This is preferably done by visually identifying the dimensions and shape of a connector receptacle. This could also include identification of the pins or connector points in the receptacle. The kiosk 100 preferably automatically connects the electrical interface to the mobile device or instructs the user how to connect the electrical connector to the electronic device. In another embodiment, the image is electronically transferred to a human operator who performs a visual evaluation and grading of the cosmetic condition of the phone. In another embodiment, if the customer does not agree with the assigned grade or rating, the kiosk 100 includes a call button to provide two way communications with a human operator to discuss the rating.

In another embodiment, a "micro-kiosk" has the same facilities for visual/electrical inspection but does not necessarily bin and store the products it evaluates. The micro-kiosk is used by an operator, perhaps with a group of discrete peripheral devices (computer, camera, a plurality of cable connectors, printer, barcode scanner, fingerprint reader, signature pad, etc.). This micro-kiosk requires an operator, store clerk, or technician, to complete transactions and guard against fraud. The micro-kiosk is preferably a more appropriate solution than a full kiosk for some venues such as floor-space limited retailers, high-customer-clerk-engagement model retailers, and phone processors and/or refurbishers.

In one embodiment, the kiosk 100 communicates with the carrier associated with the phone to collect any information that could be germane to the device, including, for example, validation or authentication, registered ownership, account status, time in service, and the like. In some cases, when the customer's identification information does not match the registered owner information, the kiosk 100 automatically contacts the assumed owner in some manner (automated telephone call, email, text message, etc.) to alert the owner of the phone of the possible transaction.

Another feature of an embodiment of the kiosk 100 is to determine if there is personal information on the phone. This is determined by the presence of data in particular storage registers in the memory (e.g., quick-key stored numbers) or by looking at file types (jpegs, mp3's, etc.), or just assuming all non-default storage locations must contain personal data. The customer is offered the chance to erase the data from the phone. One option allows the customer to request that the data be first downloaded and then sent to a location designated by the customer (e.g., email address, website, etc.). In another embodiment, there is a slot for the customer to enter a memory card (e.g. USB drive. memory stick, etc.) whereupon the kiosk 100 uploads the data to the memory device. In still another embodiment, the kiosk 100 offers a web location from which the user retrieves the data at some later time if desired. In another embodiment, the user elects to have the data placed in another phone purchased by the customer at the kiosk 100 or in the location of the kiosk 100 or some other store. The customer preferably selects a user name and password to access the system provided storage location.

Based on the results of the diagnostics, the kiosk 100 assigns the phone a rating. The rating is a selection of one of a plurality of categories (e.g. excellent, fair, average, poor), a letter grade (A, B, C, D, F), or a ranking on a numerical scale. The kiosk 100 then accesses a database to determine a real-time value for the phone based on current resale values. The kiosk 100 uses real time or batch connectivity for updating pricing of used devices, connecting to an auction system or pre-auction system.

This data can be scraped from online sites such as eBay or Craigslist, it may be generated by the kiosk 100 and updated periodically, it may be based on a consumer guide, or any other suitable method for determining a current value for the phone. The value is determined by a current market price obtained via communication to the recycling server 214 using the communications network 206. The recycling server 214 obtains a current market price for the phone from one of the service providers and stores, on a regular basis, market prices on the database. In the embodiment described in FIG. 2, a mechanism is available to update audiovisual or other user interface content or other aspects of the recycling kiosks 202 and 208. As an example, when content needs to be updated, the content only needs to be updated at the content server 218. The recycling kiosks 202 and 208 retrieve the updated content via the communications network 206 from the content server 218. As described above, the content used by a recycling kiosk 202 is preferably the same or different than content used by other recycling kiosks 208 or even another recycling kiosk 202. Once the value is determined, the value is provided at step 307 to the kiosk. The kiosk 202 then offers the customer a price or other remuneration for the phone that is typically less than the resale value. In other embodiments, the kiosk 202 offers the customer a price or remuneration that is at the current real-time market price.

At step 308 it is determined if the user wishes to accept the offer. If not, the kiosk 100 proceeds to step 309 and opens the cage door and releases the phone back to the customer. If the user wishes to accept the offer, the kiosk 100 proceeds to step 310. At a point where the user accepts a price, the kiosk 100 may then lock down the inspection area to prevent further access to the phone by the user. The kiosk 100 then disconnects any cables that have been attached. At step 310, the user indicates acceptance of the decision by confirming on the keypad or touch-screen. In one embodiment, the kiosk 100 has a multi-stage process to determine user acceptance so that the customer can back out if a mistake was made. At this point the kiosk 100 proceeds with deleting the personal data from the phone. In addition, once the transaction is confirmed, the kiosk 100 tags the phone with a transaction number that is associated with the diagnostic data and the transaction itself. This is preferably a printed adhesive label that is affixed physically to the phone and/or the loading of electronic data corresponding to the transaction number onto the phone itself for traceability purposes.

At step 311, the kiosk 100 completes any additional testing and diagnostics of the phone, disconnects the cable from the phone, and prints a receipt for the customer. Transfer of funds may be authorized via the kiosk 100 by crediting a customer credit card or account by dispensing cash, or by dispensing a voucher or coupon. In other embodiments, the kiosk 100 issues a receipt to the customer who then can take it to, for example, a store associated with the location of the kiosk, for payment. If the user has elected to donate the value of the phone to charity, the customer then is issued a donation receipt and settlement is accomplished later with the charity.

At step 312 the kiosk 100 updates its inventory database and transmits the update via the communications network 206 to the kiosk server 214.

Each kiosk 100 bins the phones according to parameters including but not limited to: vendor/model, condition, value of device, shipping priority, locked or unlocked, carrier compatibility, frequency of phone, type of cellular standard supported (CDMA, GSM, etc), or combinations of these parameters. The inventory of each kiosk bin is then be transmitted from the kiosk to and online web posting whereby live auctions can be held allowing buyers to bid and purchase specific bins from specific kiosks in real time. The bins then are shipped directly from each specific kiosk 100 to the bid winner during the next time the kiosk 100 is serviced.

The generation of these online offers is preferably automated. Appropriate text for each model of phone is prepared in advance. Descriptions of the phone are also automated based on the perceived condition of the phone. Finally, the inspection photograph(s) is included in the online offer by electronically communicating them to the kiosk server. The diagnostics and testing information is provided as part of the offer, as well as information about whether the phone is locked or unlocked, includes a sim card, expanded memory, or other descriptive information and features.

In other embodiments, the phones are first collected from the kiosk and then put into a resale channel. In some cases, the phones may be refurbished, reconditioned, or upgraded prior to resale. In another embodiment, the kiosk 100 automatically updates the firmware in the mobile phone while it is attached to the connector. Any updates or improvements that can be made electronically are preferably accomplished automatically at the kiosk 100.

Many phones and recyclable devices include proprietary chargers. One embodiment contemplates the ability for the user to plug in the charger and insert the connector into a receptacle so that the charger can be tested as well. The system then tags the charger with the same transaction number and includes its value in the price and resale.

The kiosk 100 not only rates the cosmetic condition of the phone, but also preferably rates the condition of the battery. Once connected, the kiosk 100 determines the ability of the battery to hold a charge, measures the voltage and current, and assigns a rating to the battery as well.

Figure 4:
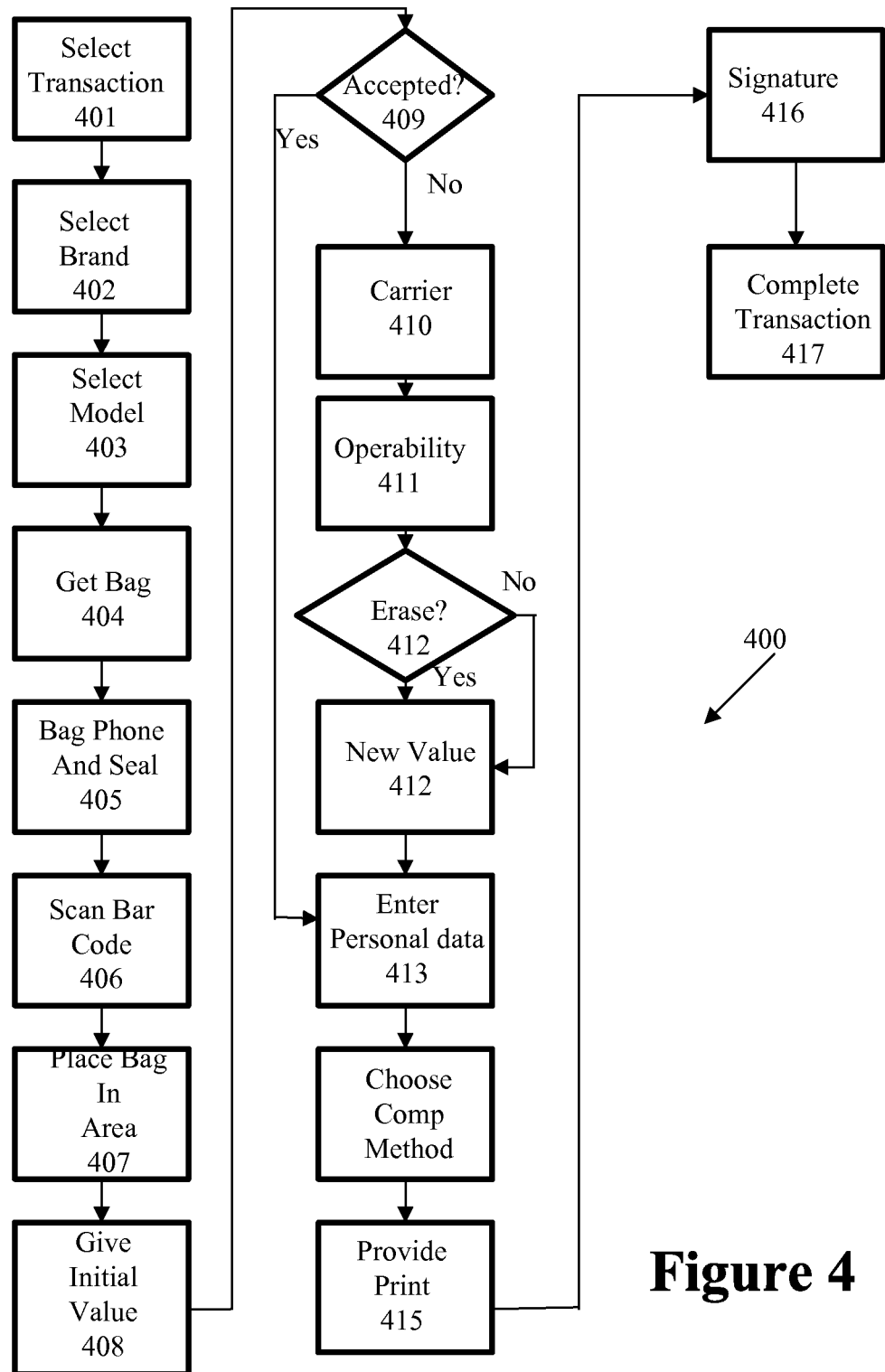
FIG. 4 is a flow diagram of an operation of recycling a mobile phone using a recycling kiosk.
Figure 5A:
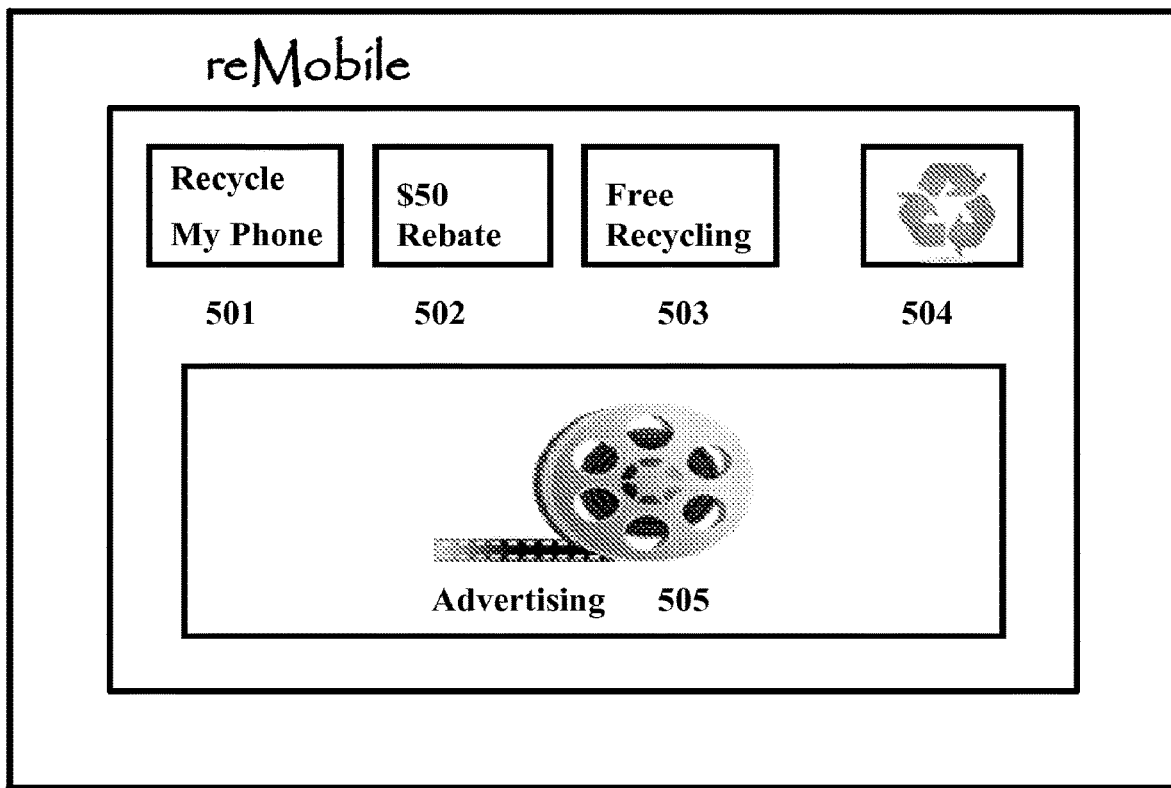
FIG. 5A is an image on a display screen of a recycling kiosk.

FIG. 4 is a diagram illustrating another embodiment of the operation of the system. The diagram of FIG. 4 is described in conjunction with embodiments of touch screen display images of FIGS. 5A-5E. At step 401 the operation begins. The display screen 119 of the kiosk 100 is shown in FIG. 5A. An upper part of the screen may include a number of selectable options such as Recycle My Cell Phone 501, Printer Recycle Offer 502, Computer Recycle Offer 503 (This may be a branded or sponsored recycle offer, such as from a single company such as Dell) and Device Recycle Offer 504 (this button may be used for other devices and recyclable items that are not covered by the first three buttons). If desired, an attract loop (i.e. movie) may be provided in a lower region 505 of the display. The attract loop may also be used to teach the user how to use the system.

In one embodiment, the kiosk 100 can broadcast WiFi to push content to WiFi enabled phones. The system can make users aware of its existence by alerting them via such wireless transmissions. In addition, the kiosk 100 could play and/or broadcast content for the store location and/or third parties as an additional revenue source.

Figure 5B:
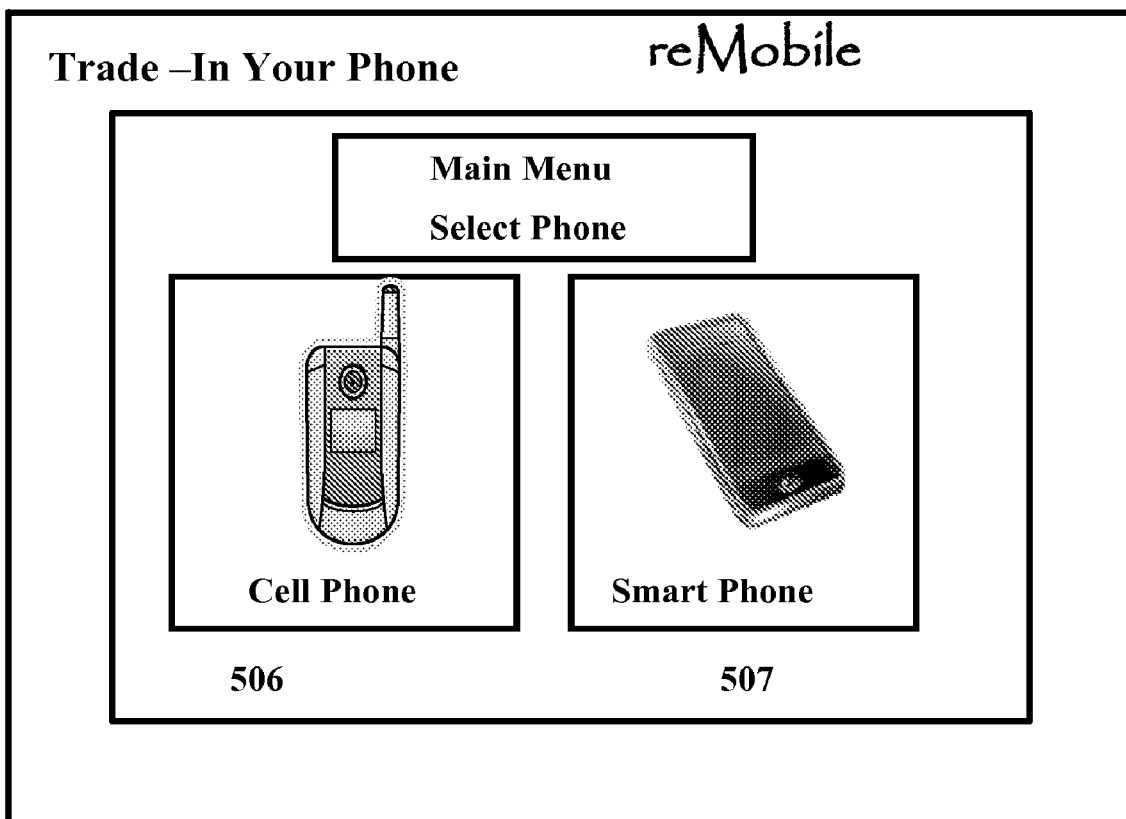
FIG. 5B is an image on a display screen of a recycling kiosk.

After the user selects the type of transaction at step 401, the kiosk 100 moves to the next screen. For purposes of example, it is presumed that the user has elected to recycle a cell phone. The user selects the type of cell phone as shown in FIG. 5B by choosing smart phone 506 or cell phone 507.

Figure 5C:
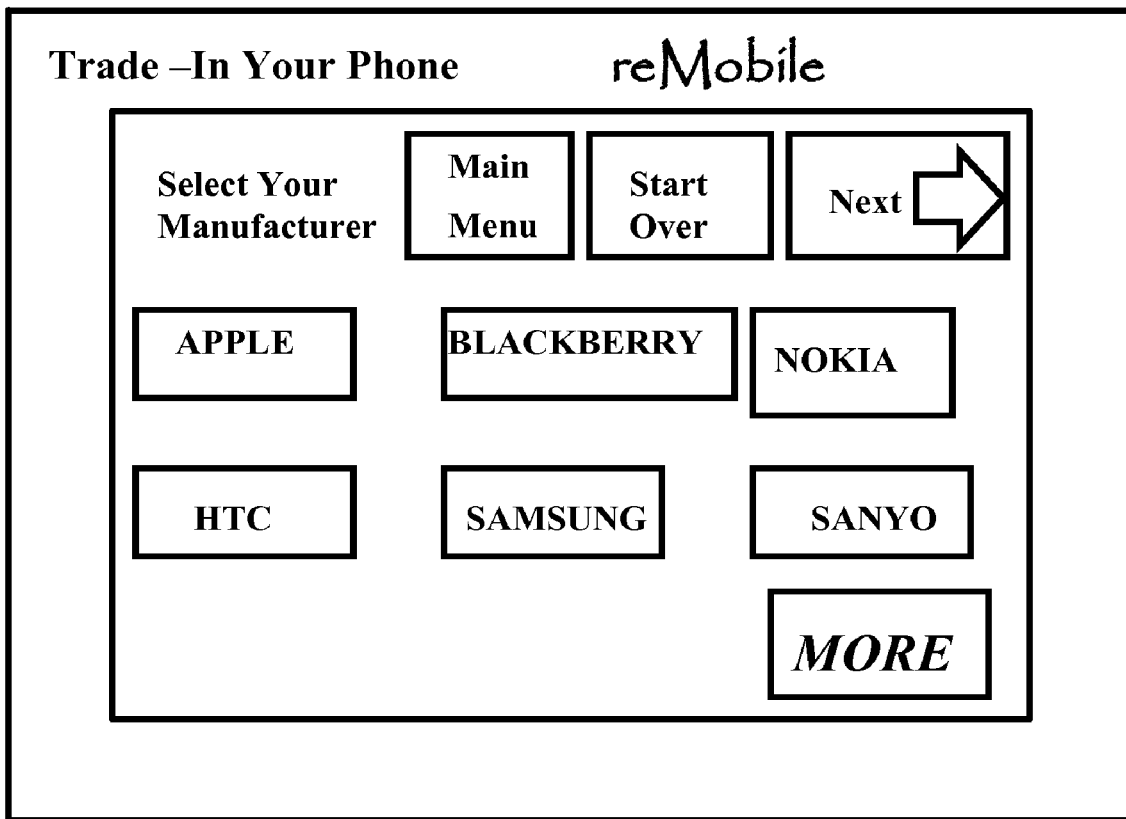
FIG. 5C is an image on a display screen of a recycling kiosk.
Figure 5D:
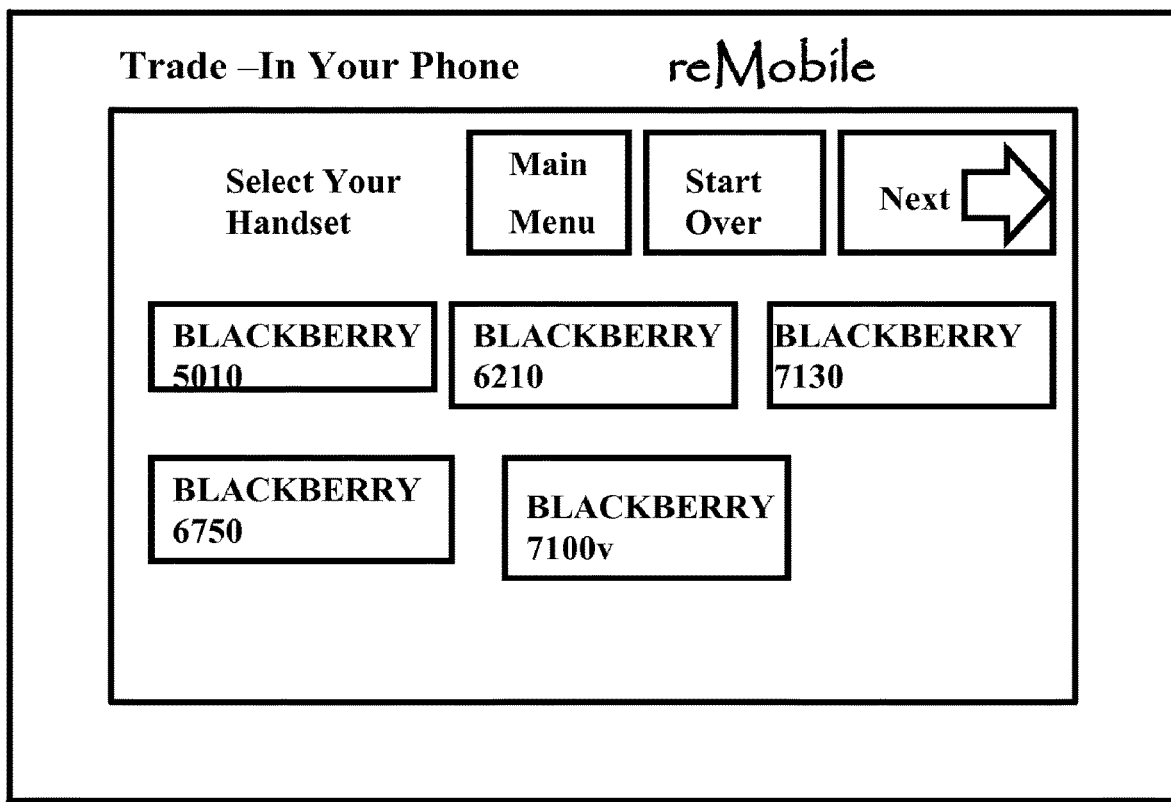
FIG. 5D is an image on a display screen of a recycling kiosk.

At step 402 the user chooses a brand of phone, such as by selecting a brand in FIG. 5C. If the users' brand is not shown in FIG. 5C, a "more" selection is available. In one embodiment, a keyboard is provided and the user can type in the brand, with an optional auto-complete feature provided. At step 403, the user is presented with a number of models for the particular manufacturer, as shown at FIG. 5D. The user selects the model at step 403.

At step 404, the user is instructed to get a bag from bag bin 120. At step 405 the user places the phone in the bag and seals it using a zip lock or some other suitable means. In one embodiment, each bag has pre-printed bar code label affixed thereto. In another embodiment, the kiosk 100 can print out a bar-coded self-adhesive label that the user can place on the bag. At step 406 the user scans the bar code using the bar code reader 125 of the kiosk 100.

Figure 5E:
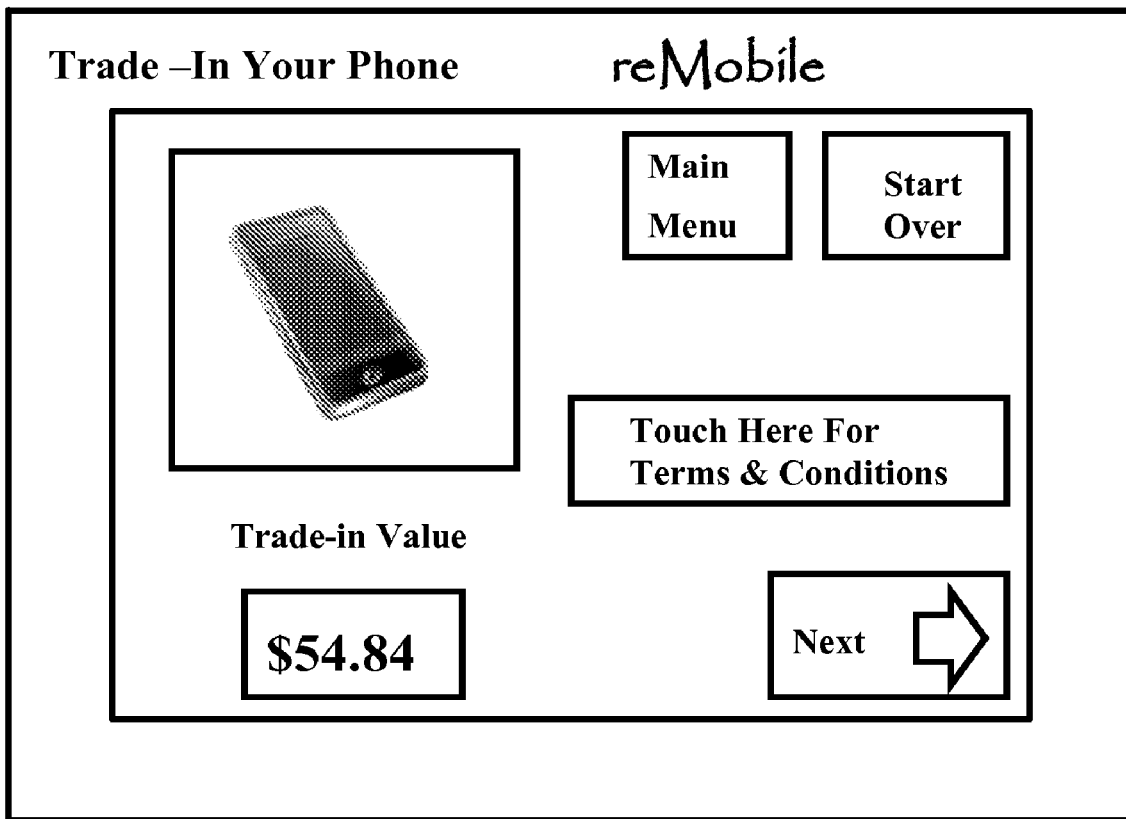
FIG. 5E is an image on a display screen of a recycling kiosk.

At step 407 the kiosk may automatically bag the device or the user places the sealed bag into the inspection bin 106 of the kiosk 100. At step 408 the user is presented with a default value such as shown in FIG. 5E. This default value is for a typical phone of that type in unknown condition. The value may be determined by accessing a locally stored database or by accessing a dynamically updated database via network communication between the kiosk and a central location.

At decision block 409 it is determined if the user wants to accept the initial price. If so, the kiosk 100 proceeds to step 413. If not, the kiosk 100 proceeds to step 410 and a series of questions to determine a possible higher value for the phone. The user is first asked to identify the carrier at step 410. At step 411 the user is asked other questions about the phone such as whether it powers on, if the display works properly and whether the phone is water damaged.

At step 412, a new value is presented to the user. In some cases, the new value is higher, while in others it may be lower, all depending on the responses provided by the user. During this time, the kiosk 100 preferably performs an automated inspection of the phone via a camera built into the inspection bin. In other instances, the user is asked to plug the phone into a connector so that an automated electronic analysis of the phone can be accomplished.

If the user accepts the new value at step 412 or at step 408, the kiosk 100 proceeds to collect personal information from the user at step 413. This may be accomplished by entering a customer loyalty number associated with a retailer where the kiosk is located, swiping a credit/debit card, by swiping a drivers license, or by manual entry using a keyboard presented on the touch screen of the kiosk.

At step 414 the user selects one of a plurality of compensation methods, such as store credit, charge card credit discount coupon, etc. After the user selects a payment method, the user is prompted to enter a fingerprint by placing a thumb or finger on print reader 128 of kiosk 100. At step 416 the user signs an electronic signature pad 130 on kiosk 100 and the transaction completes at step 417.

In an alternate embodiment, the kiosk 100 provides a network of inter-connected kiosks which communicate with centralized servers for the purpose of proving real-time pricing for a plurality of electronic devices that can be recycled using the kiosk 100, including larger electronic devices such as personal computers, microwaves, or any other recyclable electronic device. The kiosk 100 implements functionality related to pricing, credit and interaction, but provides a number of different implementations for receiving and transferring the recycled goods. The kiosk 100 may also include a web version that can be an initial entry into the system with physical transfer taking place in other methods.

The User Interface ("UI") instructs users how to determine the value of a recycled item or item being returned to a retail store for a trade-in value.

The kiosk 100 uses a variety of inspection techniques to determine the value of the device digital media. The inspection techniques include the combination of visual inspection, and electrical testing using standard (USB, HDMI, DVI, etc.) electrical interfaces and proprietary (Apple, Nokia, etc.) electrical interfaces for identification & classification to uniquely identify the manufacturer and model number and software revision.

The electronic recycling kiosk collects information that when compiled for the retailer, can be used to substantiate their compliance with States' eWaste and 2nd hand Dealer Laws.

The recycling kiosk 100 is also used to take personal information such as a photograph and fingerprint to identify people selling pre-owned goods, and as needed provide this information to local law enforcement authorities to determine if stolen goods have been moved through the recycling process, and by whom.

To prevent or reduce fraud, the system may incorporate a number of tests and analysis such as: weighing the device this is prone to errors (case, no case, battery, no battery); visually inspecting the device to detect slight design features to detect fakes; visible light or laser scan a device to derive an heat absorption/decay signature for a given device. The theory is that the decay signature is different for every make/model of device and varies with the orientation of the scan on the same device. Fake or empty devices do not have the proper signature and will not be accepted for immediate payment. In this case, the user has the option to get paid after the phone is inspected by a human.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

The invention claimed is:

1. A kiosk for evaluating an electronic device, the kiosk comprising:
    a housing;
    an inspection area within the housing and configured to receive the electronic device from a user;
    one or more cameras;
    one or more processors; and
    memory storing computer-readable instructions that, when executed by the one or more processors, cause the kiosk to—
        prompt the user to position the electronic device in the inspection area in a first orientation in which a display screen of the electronic device faces one of toward or away from a first one of the one or more cameras;
        obtain a first image of the electronic device, via the first one of the one or more cameras, when the electronic device is positioned in the inspection area in the first orientation;
        prompt the user to position the electronic device in the inspection area in a second orientation in which the display screen faces the other of toward or away from the first one of the one or more cameras;
        obtain a second image of the electronic device, via the first one of the one or more cameras or via a second one of the one or more cameras, when the electronic device is positioned in the inspection area in the second orientation; and
        present an offer to the user to purchase the electronic device for a price, wherein the price is based at least in part on a visual evaluation of the first image and/or the second image.

2. The kiosk of claim 1 wherein the computer-readable instructions, when executed by the one or more processors, cause the kiosk to prompt the user, via a user interface, to position the electronic device in the inspection area in the first orientation.

3. The kiosk of claim 1 wherein the computer-readable instructions, when executed by the one or more processors, cause the kiosk to prompt the user, via a user interface, to position the electronic device in the inspection area in the second orientation.

4. The kiosk of claim 1 wherein the computer-readable instructions, when executed by the one or more processors, cause the kiosk to present the offer to the user via a user interface.

5. The kiosk of claim 1 wherein the computer-readable instructions, when executed by the one or more processors, cause the kiosk to obtain the first image and/or the second image via at least one of the one or more processors the first one and/or the second one of the one or more cameras.

6. The kiosk of claim 1 wherein the computer-readable instructions, when executed by the one or more processors, further cause the kiosk to receive information about the electronic device via wired and/or wireless connectivity between the kiosk and the electronic device, and wherein the price is based at least in part on the visual evaluation and the received information.

7. The kiosk of claim 6 wherein the received information includes information associated with a condition of a battery of the electronic device.

8. The kiosk of claim 6 wherein the received information includes a make and/or a model of the electronic device.

9. The kiosk of claim 6 wherein the kiosk is configured to receive the information about the electronic device via a WiFi and/or Bluetooth connection between the kiosk and the electronic device.

10. The kiosk of claim 6, further comprising a connector carrier having a plurality of electrical connectors, wherein the computer-readable instructions, when executed by the one or more processors, further cause the kiosk to—
    determine a make and/or a model of the electronic device based at least in part on the first image and/or the second image; and
    identify a given connector of the plurality of electrical connectors, wherein the given connector is configured to form the wired connectivity between the kiosk and the electronic device to receive the information.

11. The kiosk of claim 1 wherein the computer-readable instructions, when executed by the one or more processors, further cause the kiosk to obtain a make and model of the electronic device based at least in part on the first image and/or the second image, and wherein the visual evaluation includes a comparison of the first image and/or the second image to a reference image of a reference electronic device of the same make and model.

12. The kiosk of claim 1 wherein the electronic device is a mobile phone.

13. A method for purchasing an electronic device, the method comprising:
    receiving, from a user, the electronic device in an inspection area of a kiosk, whereby the electronic device is positioned in a first orientation, wherein the kiosk includes one or more cameras, and wherein in the first orientation a display screen of the electronic device faces one of toward or away from a first one of the one or more cameras;
    obtaining, via the first one of one or more cameras of the kiosk, a first image of the electronic device in the first orientation;
    prompting the user to move the electronic device from the first orientation to a second orientation, different than the first orientation and in which the display screen faces the other of toward or away from the first one of the one or more cameras;
    obtaining, via the first one of the one or more cameras or a second one of the one or more cameras, a second image of the electronic device in the second orientation; and
    presenting an offer to the user to purchase the electronic device for a price, wherein the price is based at least in part on a visual evaluation of the first image and/or the second image.

14. The method of claim 13, further comprising receiving information about the electronic device via wired and/or wireless connectivity between the kiosk and the electronic device, wherein the price is based at least in part on the visual evaluation and the received information.

15. The method of claim 14 wherein receiving the information includes receiving information associated with a condition of a battery of the electronic device.

16. The method of claim 14 wherein receiving the information includes receiving information associated with a make and/or a model of the electronic device.

17. The method of claim 14 wherein receiving the information includes receiving information via a WiFi and/or Bluetooth connection between the kiosk and the electronic device.

18. The method of claim 14, further comprising:
  obtaining a make and/or a model of the electronic device based at a least in part on the first image and/or the second image; and
  identifying an electrical connector based on the make and/or the model,
  wherein the electrical connector is configured to form the wired connectivity between the kiosk and the electronic device, and
  wherein receiving the information includes receiving the information via the electrical connector.

19. The method of claim 13, further comprising obtaining a make and/or model of the electronic device based at least in part on the first image and/or the second image, wherein the visual evaluation includes identifying damage to the display screen of the electronic device by comparing the first image and/or the second image to a reference image of a reference electronic device of the same make and/or model.

20. The method of claim 13 wherein the electronic device is a mobile phone.

* * * * *

UNITED STATES PATENT AND TRADEMARK OFFICE
CERTIFICATE OF CORRECTION

| | | |
|---|---|---|
| PATENT NO. | : 12,182,773 B2 | Page 1 of 1 |
| APPLICATION NO. | : 18/462213 | |
| DATED | : December 31, 2024 | |
| INVENTOR(S) | : Mark Vincent Bowles | |

It is certified that error appears in the above-identified patent and that said Letters Patent is hereby corrected as shown below:

On the Title Page

On the page 6, in Column 1, under item (56) "Other Publications", Line 17, delete "recylcing,"" and insert -- recycling," --.

In the Specification

In Column 1, Line 7, delete "is a is a" and insert -- is a --.

In Column 1, Line 48, delete "0the" and insert -- the --.

In Column 4, Line 52, delete "IPHONE" and insert -- iPHONE --.

In Column 9, Line 31, delete "devices" and insert -- devices. --.

In Column 13, Line 26, delete "USB drive." and insert -- USB drive, --.

Signed and Sealed this
Twenty-fifth Day of February, 2025

Coke Morgan Stewart
*Acting Director of the United States Patent and Trademark Office*